US011004250B2

(12) United States Patent
Yasutomi et al.

(10) Patent No.: US 11,004,250 B2
(45) Date of Patent: May 11, 2021

(54) POINT CLOUD DATA DISPLAY SYSTEM

(71) Applicant: TOPCON CORPORATION, Tokyo (JP)

(72) Inventors: Satoshi Yasutomi, Tokyo (JP); Takahiro Komeichi, Tokyo (JP)

(73) Assignee: TOPCON CORPORATION, Tokyo (JP)

(*) Notice: Subject to any disclaimer, the term of this patent is extended or adjusted under 35 U.S.C. 154(b) by 29 days.

(21) Appl. No.: 16/573,252

(22) Filed: Sep. 17, 2019

(65) Prior Publication Data

US 2020/0105043 A1    Apr. 2, 2020

(30) Foreign Application Priority Data

Sep. 28, 2018  (JP) .............................. JP2018-185900

(51) Int. Cl.
| | |
|---|---|
| *G06T 15/00* | (2011.01) |
| *G06F 16/29* | (2019.01) |
| *G01S 17/42* | (2006.01) |
| *G01S 17/89* | (2020.01) |

(52) U.S. Cl.
CPC .............. *G06T 15/00* (2013.01); *G01S 17/42* (2013.01); *G01S 17/89* (2013.01); *G06F 16/29* (2019.01); *G06T 2210/56* (2013.01)

(58) Field of Classification Search
CPC .......... G06T 15/00; G06F 16/29; G01S 17/42
USPC ....................................................... 345/419
See application file for complete search history.

(56) References Cited

U.S. PATENT DOCUMENTS

| | | | |
|---|---|---|---|
| 2005/0018901 A1* | 1/2005 | Kaufmann | ............. G06T 17/20 382/154 |
| 2005/0189469 A1* | 9/2005 | Sugiura | .................. G01S 17/42 250/201.2 |
| 2013/0202197 A1 | 8/2013 | Reeler et al. | |
| 2014/0300886 A1 | 10/2014 | Zogg et al. | |
| 2015/0029489 A1 | 1/2015 | Metzler et al. | |
| 2015/0253137 A1 | 9/2015 | Jensen et al. | |
| 2016/0138919 A1 | 5/2016 | Green et al. | |

(Continued)

FOREIGN PATENT DOCUMENTS

| | | |
|---|---|---|
| EP | 2620746 A1 | 7/2013 |
| EP | 2787322 A1 | 10/2014 |

(Continued)

*Primary Examiner* — Hai Tao Sun
(74) *Attorney, Agent, or Firm* — Roberts Calderon Safran & Cole P.C.

(57) ABSTRACT

A point cloud data display system includes a target unit including a reflection target, a scanner device configured to acquire point cloud data, a surveying instrument configured to obtain a distance and an angle to the reflection target, measured coordinates and a direction angle of the scanner device, and a display device configured to display data output from the scanner device and the surveying instrument. The scanner device outputs point cloud data in association with an observation point each time of acquisition of the point cloud data. The surveying instrument outputs coordinates, a direction angle of the scanner device at the observation point. When the point cloud data, coordinates and direction angle with respect to the observation point are obtained, the display device converts point cloud data into data in a map coordinate system and displays the converted data on a display unit in association with a map.

7 Claims, 19 Drawing Sheets

(56) References Cited

U.S. PATENT DOCUMENTS

2016/0178406 A1    6/2016  Wang
2017/0307370 A1*  10/2017  Tanaka ................... G01C 1/04
2020/0103525 A1    4/2020  Yasutomi et al.

FOREIGN PATENT DOCUMENTS

| | | |
|---|---|---|
| EP | 2916104 A1 | 9/2015 |
| EP | 3021078 A1 | 5/2016 |
| JP | 2002074323 A | 3/2002 |
| WO | 2011153624 A2 | 12/2011 |

* cited by examiner

POINT CLOUD DATA DISPLAY SYSTEM

CROSS-REFERENCE TO RELATED APPLICATION

The present application claims priority under 35 U.S.C. § 119 to Japanese Patent Application No. 2018-185900 filed Sep. 28, 2018. The contents of this application are incorporated herein by reference in their entirely.

TECHNICAL FIELD

The present invention relates to a point cloud data displaying method, more specifically, to a display system for point cloud data acquired by a ground-installed scanner device.

BACKGROUND

Conventionally, as a system for acquiring three-dimensional data of terrain and features, a system for acquiring point cloud data of a measuring object or a measurement range from a plurality of points by using a ground-installed scanner device is known.

The scanner device rotationally irradiates laser pulsed light through a scanning unit, scans a measuring object, and performs a distance measurement and an angle measurement by each pulsed light so as to acquire three-dimensional point cloud data of the measuring object or range in a coordinate system centered at the scanner device.

With this system, point cloud data at each instrument point, and coordinate and direction angle data on each instrument point, were acquired and brought back to an office, the point cloud data and coordinate and direction angle data were input into a data processing device such as a PC, the point cloud data were converted into data in a map coordinate system, and processing to integrate the point cloud data and display of the observation results were performed. However, at an actual survey site, there was no display made in relation to a map.

CITATION LIST

Patent Literature

Patent Literature 1 Japanese Published Unexamined Patent Application No. 2002-74323

SUMMARY OF INVENTION

Technical Problem

The present invention was made in view of the above-described circumstances, and an object thereof is to provide a technology capable of checking a point cloud data acquisition status on a map in real time at a survey site.

Solution to Problem

In order to solve the above-described problem, a point cloud data display system according to an aspect of the present invention includes: a target unit including a reflection target; a scanner device including a distance measuring unit configured to perform a distance measurement by transmitting distance measuring light and receiving reflected distance measuring light reflected by a measuring object, a scanning unit configured to scan a measurement range by distance measuring light, an angle detector configured to detect an angle, and an arithmetic control unit configured to acquire point cloud data of the measurement range; a surveying instrument including a survey unit configured to measure a distance and an angle to the reflection target, and an arithmetic control unit configured to calculate measured coordinates and a direction angle of the scanner device based on distance and angle measurement data of the reflection target; and a display device including an arithmetic control unit configured to process data output from the scanner device and the surveying instrument, and a display unit, wherein the scanner device outputs the point cloud data to the display device in association with an observation point each time of acquisition of the point cloud data, the surveying instrument outputs coordinates and a direction angle of the scanner device at the observation point to the display device in association with the observation point, and the arithmetic control unit of the display device includes a data accepting unit configured to determine whether point cloud data and coordinates and a direction angle of the scanner device have been all obtained with respect to the observation point, a data conversion unit configured to convert the point cloud data into data in a map coordinate system, and a display control unit configured to successively display converted point cloud data on the display unit in association with a map.

In the aspect described above, it is also preferable that the point cloud data display system further includes: a leveling base configured to selectively allow one of the target unit, the scanner device, and the surveying instrument to be removably mounted so as to share a central axis in the vertical direction, and has offset angles, being known, around the central axis with respect to each of the target unit, the scanner device, and the surveying instrument, wherein the target unit includes an encoder pattern showing an angle in a circumferential direction around the central axis of the target unit, the surveying instrument is a surveying device including an encoder pattern reading unit configured to optically read the encoder pattern, the arithmetic control unit of the surveying instrument calculates an encoder pattern read angle based on a result of reading by the encoder pattern reading unit, calculates a direction angle of the leveling base based on an encoder pattern read angle of the target unit installed by mounting on the leveling base, and the offset angle of the target unit, and calculates coordinates of an installation point of the target unit in a map coordinate system based on measured coordinates of the reflection target of the target unit installed by mounting on the leveling base and the direction angle, and the arithmetic control unit of the surveying instrument calculates a direction angle of the surveying instrument based on the offset angle of the surveying instrument and the direction angle of the leveling base, and calculates a direction angle of the scanner device based on the offset angle of the scanner device and the direction angle of the leveling base.

In the aspect described above, it is also preferable that the surveying instrument is the scanner device, and the arithmetic control unit of the scanner device includes a target scanning performing unit configured to acquire the distance and angle measurement data based on point cloud data obtained by intensively scanning a periphery of the reflection target, and calculates measured coordinates and a direction angle of the scanner device.

In the aspect described above, it is also preferable that the point cloud data display system further includes a leveling base configured to selectively allow either of the target unit and the scanner device to be removably mounted so as to share a central axis in the vertical direction, and has offset angles, being known, around the central axis with respect to each of the target unit and the scanner device, wherein the target unit includes an encoder pattern showing an angle in a circumferential direction around the central axis of the target unit, the scanner device includes an encoder pattern reading unit configured to optically read the encoder pattern, the arithmetic control unit of the scanner device calculates an encoder pattern read angle based on a result of reading by the encoder pattern reading unit, calculates a direction angle of the leveling base based on an encoder pattern read angle of the target unit installed by mounting on the leveling base, and the offset angle of the target unit, and calculates coordinates of an installation point of the target unit in a map coordinate system based on measured coordinates of the reflection target of the target unit installed by mounting on the leveling base and the direction angle, and the arithmetic control unit of the scanner device calculates a direction angle of the scanner device based on the offset angle of the scanner device and the direction angle of the leveling base.

In the aspect described above, it is also preferable that the scanner device includes the display device.

In the aspect described above, it is also preferable that the scanner device includes a point cloud data extraction unit configured to partially extract the point cloud data, and output the extracted data to the display device.

Benefit of Invention

According to the aspects described above, a point cloud data acquisition status can be checked on a map in realtime at a survey site.

DESCRIPTION OF EMBODIMENTS

Preferred embodiments of the present invention are described with reference to the drawings. In the following description of the embodiments, the same components are provided with the same reference signs, and overlapping description is omitted. In each drawing, components may be enlarged and schematically illustrated as appropriate for convenience of description, and which may not reflect actual ratios. The embodiments described below are just examples, and the present invention is not limited to these.

1. First Embodiment 1-1. Overall Configuration

Figure 1:
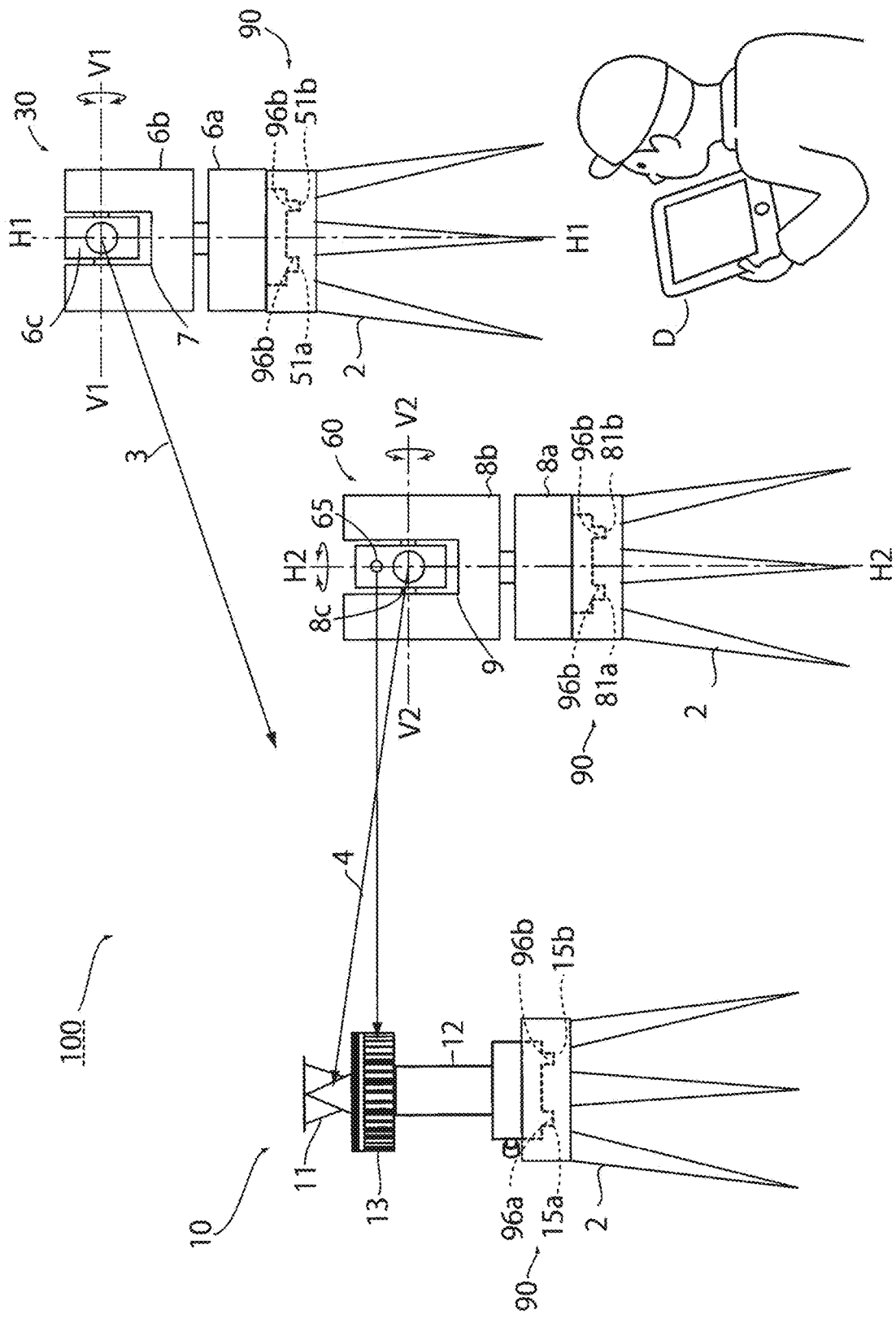
FIG. 1 is a view illustrating an overall configuration of a point cloud data display system according to a first embodiment of the present invention.

FIG. 1 is a view illustrating a schematic configuration of a point cloud data display system 100 according to an embodiment of the present invention. The point cloud data display system 100 includes a target unit 10, a scanner device 30, a surveying device 60, a leveling base 90, and a display device D.

1-2. Configuration of Target Unit

Figure 2:
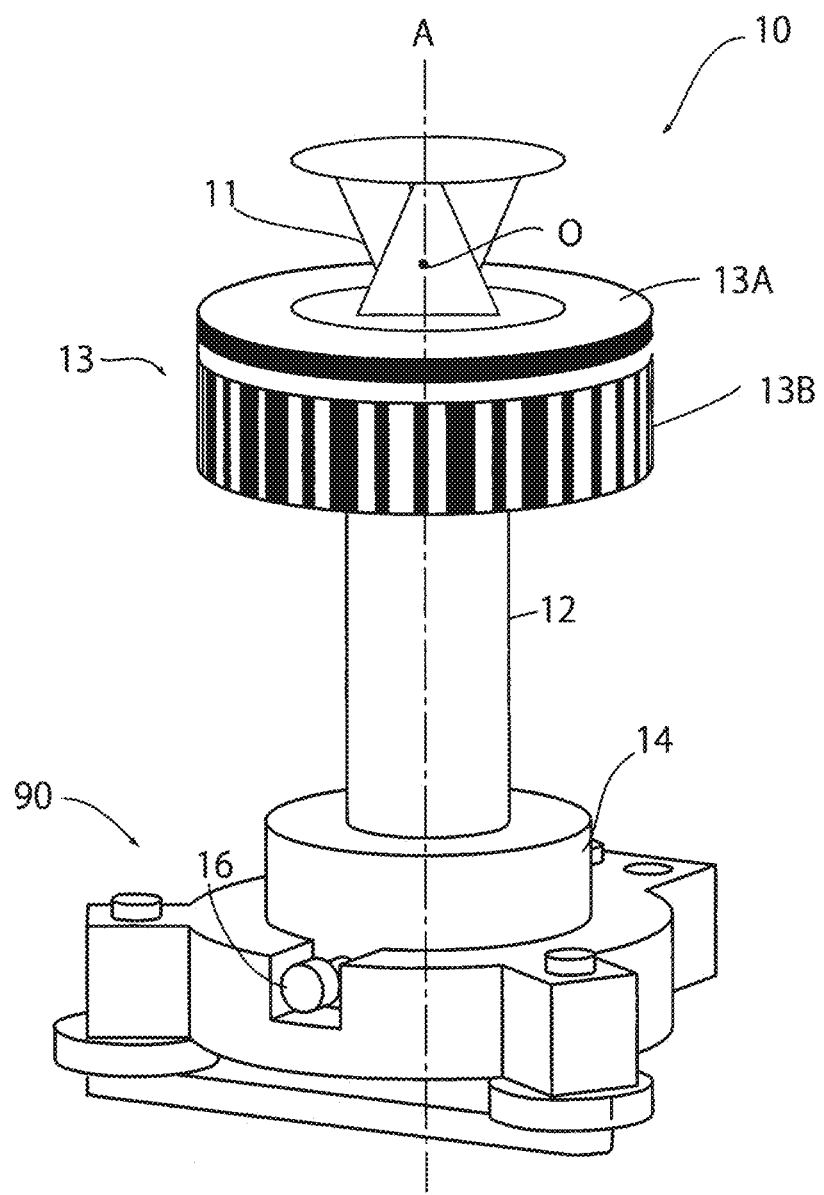
FIG. 2 is a perspective view illustrating a state where a target unit according to the same embodiment is fitted to a leveling base.

As illustrated in FIG. 2, the target unit 10 includes a reflection target 11, a support member 12, an encoder pattern portion 13, and a base portion 14, and is removably mounted on the leveling base 90 mounted on a tripod 2, and held vertically.

The reflection target 11 is a so-called 360-degree prism configured by, for example, radially combining a plurality of triangular pyramid prisms, and reflects light made incident from its entire circumference (360°) toward directions opposite to the incident directions.

The support member 12 is, for example, a columnar member made of metal or resin, extending upward so as to have a fixed length from the base portion 14. The support member 12 fixes and supports the encoder pattern portion 13 and the reflection target 11 so that a central axis A of the support member passes through a center $O_E$ (FIG. 3A) (of a base 13A) of the encoder pattern portion 13. A central axis of the base 13A and the central axis A of the support member 12 that are common to each other are configured to pass through the center O of the reflection target 11. That is, the central axis A of the support member 12 is a central axis of the target unit 10.

The encoder pattern portion 13 is configured by providing an encoder pattern 13B on a side circumferential surface of the base 13A that is in a short columnar shape.

The encoder pattern 13B includes an angle information portion 131 and a width information portion 132 above and adjacent to the angle information portion 131.

Figure 3A:
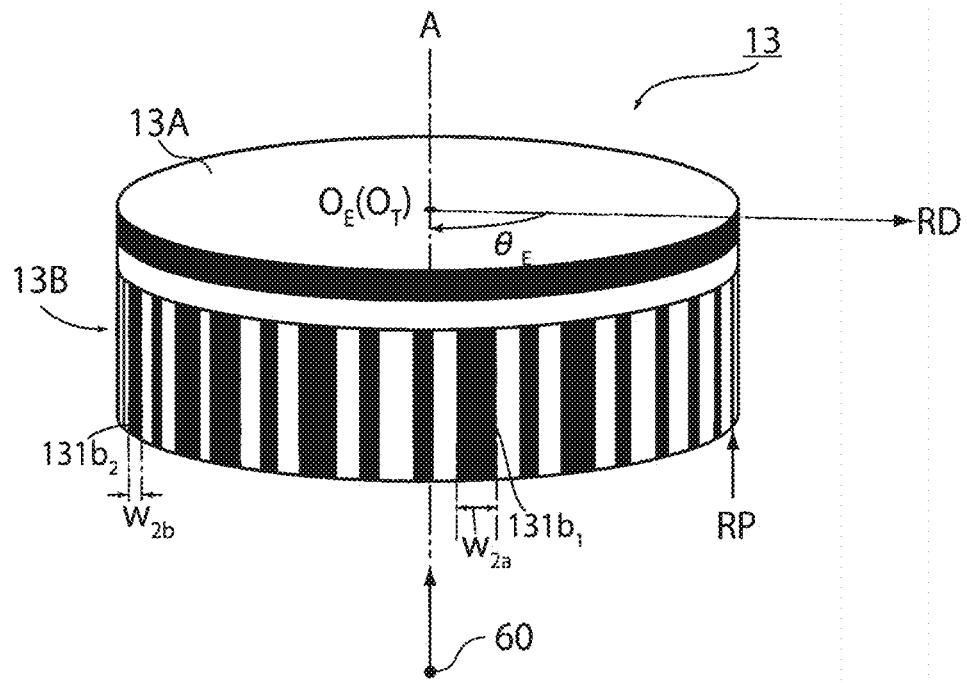
FIG. 3A is an enlarged perspective view of an encoder pattern portion relating to the target unit according to the same embodiment.
Figure 3B:
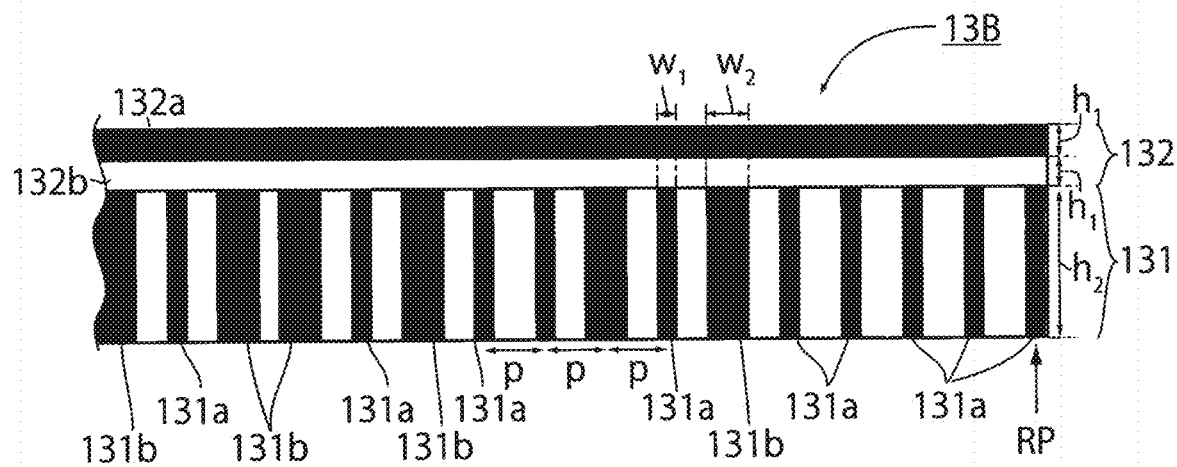
FIG. 3B is a partial developed view of an encoder pattern of the encoder pattern portion.

As illustrated in FIG. 3A and FIG. 3B, the angle information portion 131 is a barcode-like pattern formed by disposing, for example, narrow-width black vertical lines 131a with a width $w_1$ and wide-width black vertical lines 131b with a width $w_2$ at even pitches p on a white background by defining the vertical lines 131a as "0" and the vertical lines 131b as "1" so as to generate an M-sequence recurring random number code. The encoder pattern 13B is configured so that, by setting a direction RD from the center of the encoder pattern portion 13 to a reference point RP (hereinafter, referred to as a "reference direction of the encoder pattern") as 0°, an angle (hereinafter, referred to as an "encoder pattern read angle") $\theta_E$ calculated from the pattern read by a camera (encoder pattern reading unit) 65 corresponds to an absolute angle in a clockwise circumferential direction around the central axis A of the support member 12, from the reference direction RD of the encoder pattern 13B.

The width information portion 132 includes a black zone 132a with a predetermined height $h_1$ and a white zone 132b with the same height. The black zone 132a and the white zone 132b respectively extend across the entire circumference of the encoder pattern portion 13 in the circumferential direction.

The encoder pattern portion 13 is disposed below and adjacent to the reflection target 11. However, the positional relationship between the encoder pattern portion 13 and the reflection target 11 is not limited to this, and other dispositions are possible as long as the encoder pattern portion 13 is disposed to be coaxial with the central axis A of the support member 12 passing through the center O of the reflection target 11.

Figure 6:
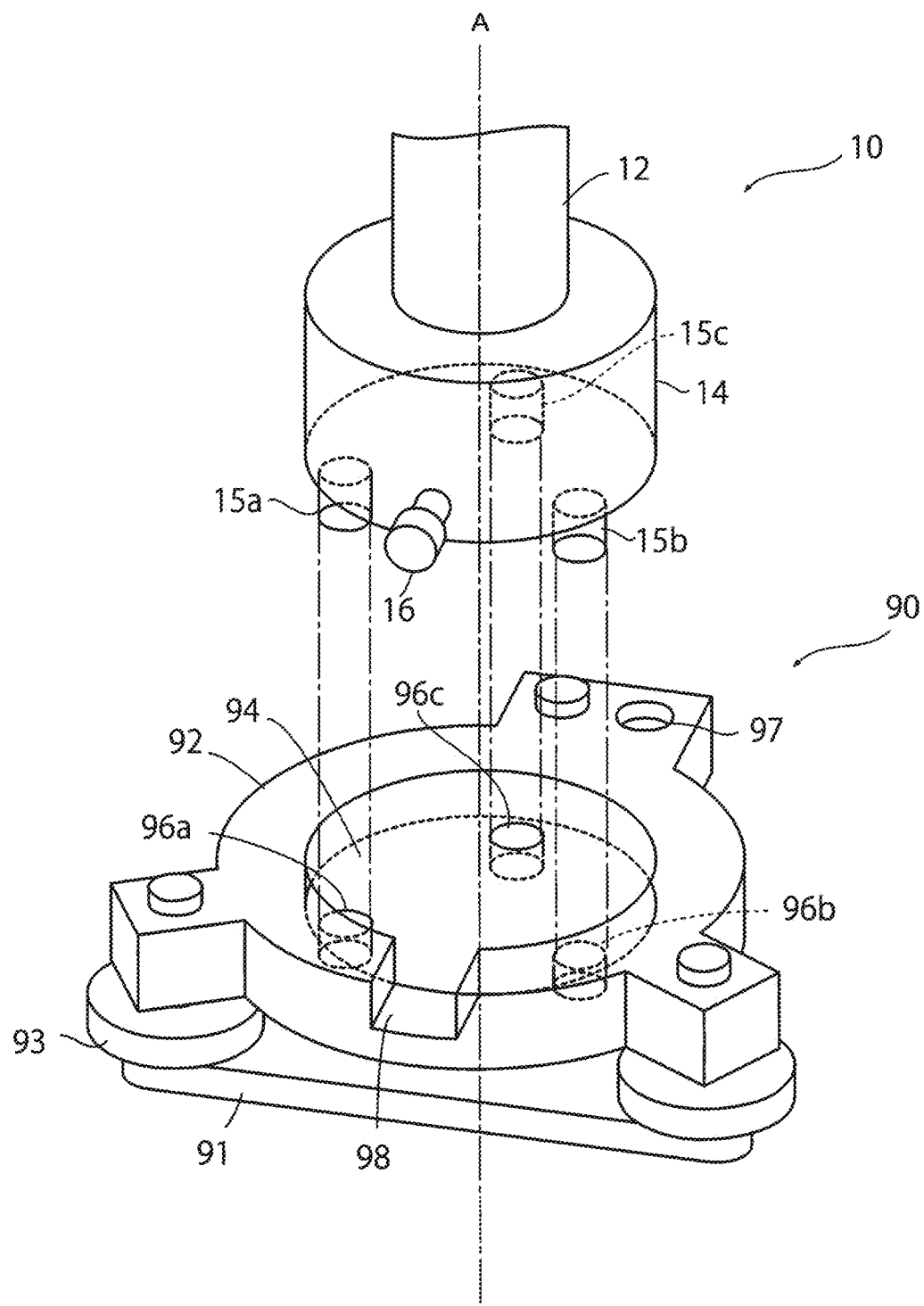
FIG. 6 is a view illustrating a mounting structure of the target unit to the leveling base according to the same embodiment.

The base portion 14 is, for example, a columnar member made of metal or resin, which is larger in diameter than the support member 12, and provided coaxially with the support member 12. The base portion 14 has dimensions matching a base mounting hole 94 of the leveling base 90 (FIG. 6). On a bottom surface of the base portion 14, engagement projections 15a, 15b, and 15c (FIG. 6) that respectively engage with engagement holes 96a, 96b, and 96c of the leveling base 90 as described later are provided at three positions at even intervals in the circumferential direction with respect to the central axis A of the support member 12.

On a side circumferential surface of the base portion 14, a positioning projection 16 is provided so as to project in a radial direction.

1-3. Configuration of Scanner Device

Figure 4:
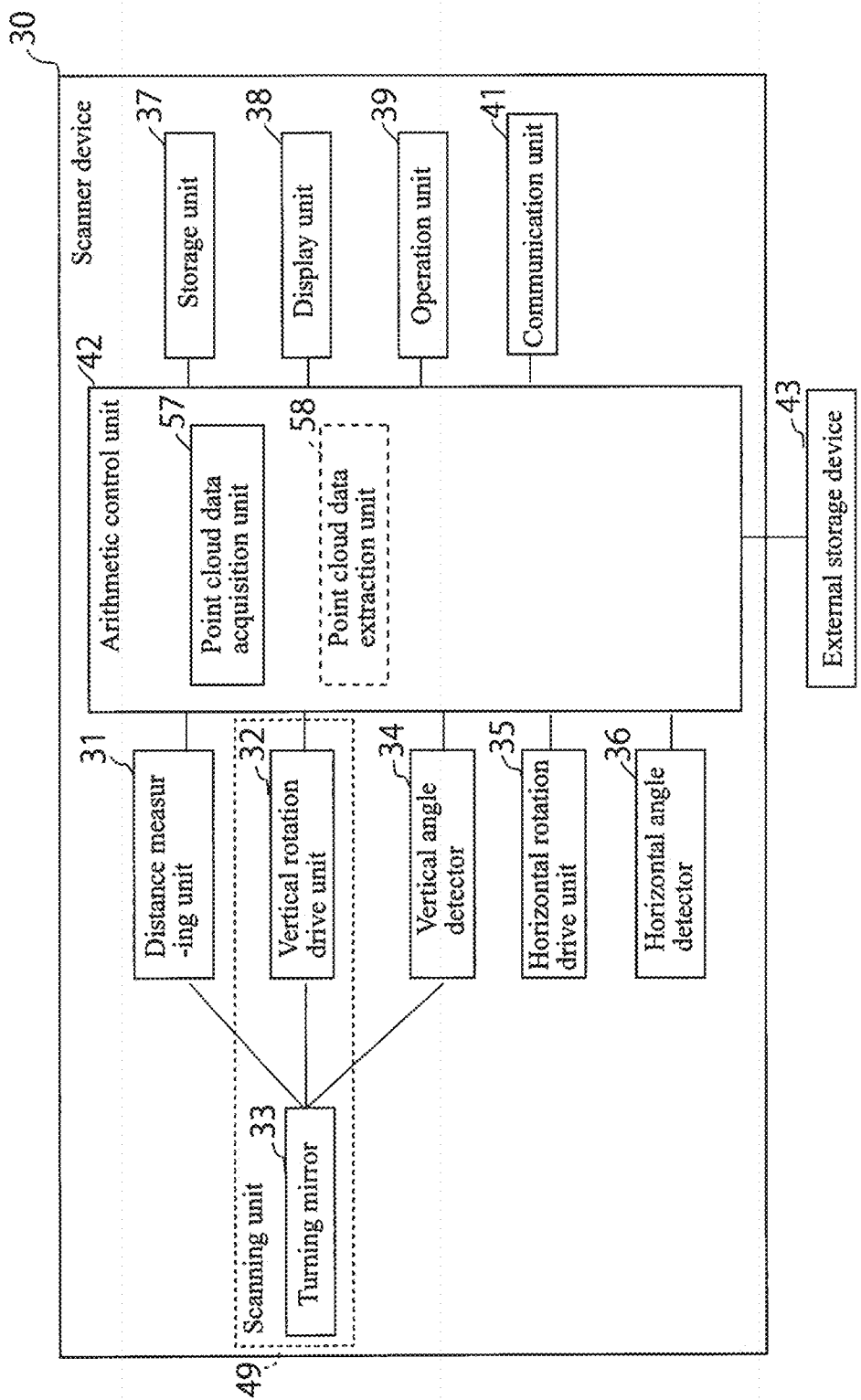
FIG. 4 is a configuration block diagram of a scanner device according to the same embodiment.

FIG. 4 is a configuration block diagram of the scanner device 30. The scanner device 30 is a so-called laser scanner, and includes a distance measuring unit 31, a vertical rotation drive unit 32, a turning mirror 33, a vertical angle detector 34, a horizontal rotation drive unit 35, a horizontal angle detector 36, a storage unit 37, a display unit 38, an operation unit 39, a communication unit 41, an arithmetic control unit 42, and an external storage device 43.

As illustrated in FIG. 1, the scanner device 30 is installed via the leveling base 90 mounted on a tripod 2, in the same manner as the target unit 10. The scanner device 30 includes a base portion 6a to be removably mounted on the leveling base 90, a bracket portion 6b provided to be horizontally rotatable 360° around an axis H1-H1, and a telescope portion 6c provided to be vertically rotatable around an axis V1-V1 in a concave portion 7 of the bracket portion 6b.

In the base portion 6a, the horizontal rotation drive unit 35 and the horizontal angle detector 36 that detects a rotation angle around the axis H1-H1 of horizontal rotation are housed. The horizontal rotation drive unit 35 is, for example, a motor, and the horizontal angle detector 36 is, for example, a rotary encoder. The horizontal rotation drive unit 35 rotates the bracket portion 6b around the axis H1-H1 of horizontal rotation, and the horizontal angle detector 36 detects a rotation angle of the bracket portion 6b around the axis H1-H1 of horizontal rotation with respect to the base portion 6a, and outputs a detection signal to the arithmetic control unit 42.

A bottom portion of the base portion 6a has the same configuration as that of a bottom portion of the base portion 14 of the target unit 10. That is, the bottom portion is shaped in a columnar shape matching the base attaching hole 94 of the leveling base 90, and a bottom surface of the bottom portion has a shape matching the engagement holes 96a, 96b, and 96c of the leveling base 90, and is provided with engagement projections 51a, 51b, and 51c (FIG. 9C). On a side circumferential surface of the bottom portion of the base portion 6a, a positioning projection 52 is provided.

In the bracket portion 6b, the vertical rotation drive unit 32, the vertical angle detector 34, the storage unit 37, and the arithmetic control unit 42 are provided. The display unit 38 and the operation unit 39 are provided outside the bracket portion 6b.

The vertical rotation drive unit 32 is a motor, and is provided with respect to an axis V1-V1 of vertical rotation. In response to rotation of the vertical rotation drive unit, the telescope portion 6c rotates 360 degrees in the vertical direction. The vertical angle detector 34 is, for example, a rotary encoder. The vertical angle detector 34 is provided on an axis V1-V1 of vertical rotation, and detects a rotation angle around the axis V1-V1 and outputs a detection signal to the arithmetic control unit 42.

In the telescope portion 6c, the distance measuring unit 31 is housed. Inside the telescope portion 6c, a lens barrel (not illustrated) including the turning mirror 33 is provided, and an axis of horizontal rotation of the lens barrel is coaxial with the axis H1-H1 of horizontal rotation of the bracket portion 6b. The lens barrel is mounted in the telescope portion 6c by a proper means.

The distance measuring unit 31 includes a distance measuring light transmission and receiving optical system including a distance measuring light transmission unit, a distance measuring light receiving unit, a beam splitter, and the turning mirror 33, etc.

The distance measuring light transmission unit includes a light emitting element (not illustrated), for example, a semiconductor laser or the like, and emits a pulsed laser light beam as distance measuring light. The emitted distance measuring light 3 is reflected by a distance measuring light mirror, and further reflected by the turning mirror 33 and irradiated onto a measuring object. The turning mirror 33 is a double-sided mirror, and is driven by the vertical rotation drive unit 32 to rotate around an axis V1-V1 of vertical rotation. The turning mirror 33 and the vertical rotation drive unit 32 constitute a scanning unit 49 to scan the distance measuring light 3 in the vertical direction.

The distance measuring light 3 retroreflected by a measuring object is received by the distance measuring light receiving unit being a light receiving element, for example, a photodiode through the turning mirror 33, and based on internal reference light being a portion of the distance measuring light split by the beam splitter, a distance to an irradiation point is obtained by the arithmetic control unit 42.

By cooperation of a rotation of the turning mirror 33 in the vertical direction and a rotation of the bracket portion 6b in the horizontal direction, two-dimensional scanning with the distance measuring light is performed. Distance measurement data for each pulsed light is acquired by the distance measuring unit 31, and angle measurement data for each pulsed light is acquired by the vertical angle detector 34 and the horizontal angle detector 36. Full-dome scanning (360-degree scanning) is performed by rotating 270° including a vertex in the vertical direction and rotating 360° in the horizontal direction, and thus, three-dimensional point cloud data entirely around the measurement range are acquired.

The storage unit 37 is, for example, a RAM (Random Access Memory), etc., and stores various programs for activating the scanner device 30.

The display unit 38 is, for example, a liquid crystal display or the like, and displays operation status data and measurement results, etc., obtained by the arithmetic control unit 42.

The operation unit 39 is a touch display, a keyboard, or the like, and inputs operation commands into the scanner device 30.

The communication unit 41 enables communication between the scanner device 30 and the display device D, and outputs point cloud data to the display device D. The communication may be wired communication or wireless communication.

The arithmetic control unit 42 includes, for example, a CPU (Central Processing Unit). By reading a program stored in the storage unit 37 and executing the program by the arithmetic control unit 42, various functions of the scanner device 30 are executed.

The arithmetic control unit 42 is electrically connected to the distance measuring unit 31, the vertical rotation drive unit 32, the vertical angle detector 34, the horizontal rotation drive unit 35, the horizontal angle detector 36, the storage unit 37, the display unit 38, the operation unit 39, and the external storage device 43.

Into the arithmetic control unit 42, angle detection signals from the vertical angle detector 34 and the horizontal angle detector 36 are input, and a light receiving signal from the distance measuring light receiving unit 45 is input. In addition, a signal from the operation unit 39 in response to an operator's operation is input.

The arithmetic control unit 42 drives the distance measuring light transmission unit 44, the vertical rotation drive unit 32, and the horizontal rotation drive unit 35, and controls the display unit 38 that displays an operation status and measurement results, etc.

The arithmetic control unit 42 includes, as functional units to execute various programs, a point cloud data acquisition unit 57 and a point cloud data extraction unit 58. The point cloud data acquisition unit 57 operates results of measurements of distances and angles to respective points at which distance measuring light was rotationally irradiated on the measuring object (range), and acquires point cloud data.

The arithmetic control unit 42 outputs acquired point cloud data to the external storage device 43.

The external storage device 43 is, for example, a memory card, a hard disk drive, a USB memory, or the like, and stores point cloud data. The external storage device may be fixed to or may be removably provided in the arithmetic control unit 42.

1-4. Configuration of Surveying Device

Figure 5:
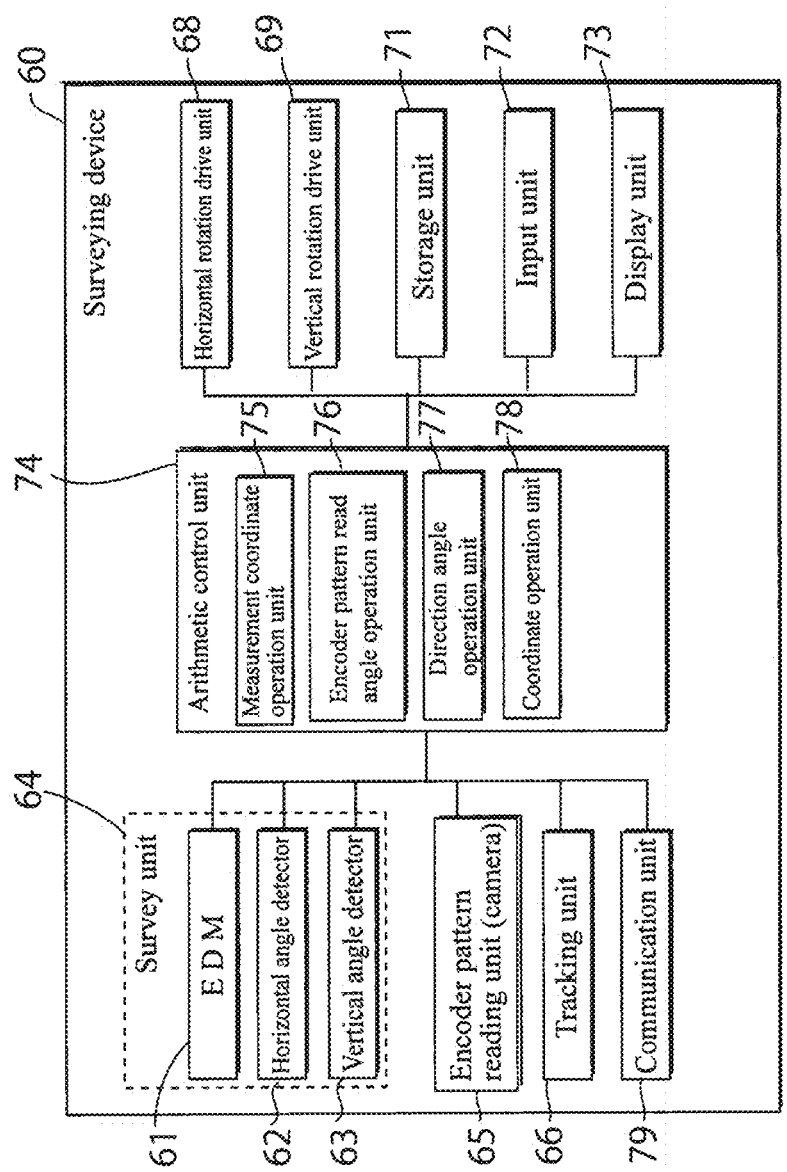
FIG. 5 is a configuration block diagram of a surveying device according to the same embodiment.

The surveying device 60 in the present embodiment is a total station. As illustrated in FIG. 5, the surveying device 60 includes an EDM (Electro-optical Distance Measuring Instrument) 61, a horizontal angle detector 62, a vertical angle detector 63, a camera 65 functioning as an encoder pattern reading unit, a tracking unit 66, a horizontal rotation drive unit 68, a vertical rotation drive unit 69, a storage unit 71, an input unit 72, a display unit 73, an arithmetic control unit 74, and a communication unit 79.

The surveying device 60 is installed via the leveling base 90 mounted on a tripod 2, in the same manner as the target unit 10 and the scanner device 30. In appearance, the surveying device 60 includes a base portion 8a to be removably mounted on the leveling base 90, a bracket portion 8b provided on the base portion 8a so as to be horizontally rotatable 360° around an axis H2-H2, and a telescope 8c provided in a concave portion 9 of the bracket portion 8b so as to be vertically rotatable around an axis V2-V2.

In the base portion 8a, the horizontal rotation drive unit 68, and the horizontal angle detector 62 that detects a rotation angle around the axis H2-H2 of horizontal rotation, are housed.

In the bracket portion 8b, the vertical angle detector 63, the vertical rotation drive unit 69, the storage unit 71, and the arithmetic control unit 74 are housed. Outside the bracket portion 8b, the input unit 72 and the display unit 73 are provided.

In the telescope 8c, the EDM 61 and the tracking unit 66 are housed, and the camera 65 is attached to an upper portion of the telescope 8c.

A bottom portion of the base portion 8a is configured in the same manner as the target unit 10, and for mounting on the leveling base 90, a bottom surface of the base portion is provided with engagement projections 81a, 81b, and 81c (refer to FIG. 7D), and on an outer circumferential side surface, a positioning projection 82 is provided.

The EDM 61 includes a light emitting element, a distance measuring optical system, and a light receiving element. The EDM 61 emits distance measuring light 4 from the light emitting element, receives reflected light from the reflection target 11 by the light receiving element, and measures a distance to the reflection target 11.

The horizontal angle detector 62 and the vertical angle detector 63 are rotary encoders, and detect rotation angles around rotation axes of the bracket portion 8b and the telescope 8c respectively driven by the horizontal rotation drive unit 68 and the vertical rotation drive unit 69, and obtain a horizontal angle and a vertical angle of a distance measuring optical axis.

The EDM 61, the horizontal angle detector 62, and the vertical angle detector 63 constitute a survey unit 64 being an essential portion of the surveying device 60.

The camera 65 includes an optical system and an imaging device publicly known as a camera. The camera 65 is attached to an upper portion of the telescope 8c so as to be parallel to the telescope 8c. The camera 65 is configured to be collimated to the encoder pattern portion 13 having a fixed positional relationship with the reflection target 11 in a state where the telescope 8c is collimated to the reflection target 11.

Therefore, the camera 65 may be configured to be turnable up, down, leftward, and rightward when imaging. As the imaging device, an image sensor such as a CCD sensor, a CMOS sensor, or the like is used. The camera 65 receives light by using a light receiving element through the optical system, and forms an image of the light.

The tracking unit 66 includes a tracking optical system that includes a light emitting element to emit tracking light, and a light receiving element being an image sensor, for example, a CCD sensor or a CMOS sensor, etc., and shares optical elements with the distance measuring optical system. The tracking unit 66 is configured to project infrared laser light with a wavelength different from that of distance measuring light onto a tracking object (target), receives reflected light from the tracking object, and track the tracking object based on results of light reception.

The tracking unit 66 is not essential, and may be omitted when a tracking function is not necessary. When the tracking unit 66 is provided, it is also possible that the functions of the camera 65 are incorporated in the tracking unit 66 and the independent camera 65 is omitted.

The horizontal rotation drive unit 68 and the vertical rotation drive unit 69 are motors, and are respectively provided on an axis H2-H2 of horizontal rotation and an axis V2-V2 of vertical rotation. The horizontal rotation drive unit and the vertical rotation drive unit are controlled by the arithmetic control unit 74 to respectively rotate the bracket portion 8b horizontally and the telescope 8c vertically.

The storage unit 71 includes a ROM and a RAM. The storage unit 71 stores various programs for activating the surveying device 60. For example, the storage unit stores a sequence program for performing a distance measurement and an angle measurement, an arithmetic operation program for operating coordinates of the leveling base, and a program for reading the encoder pattern and operate a read angle, etc. These programs are read by the RAM and execution is started by the arithmetic control unit 74 so as to perform various processings of the surveying device 60.

The storage unit 71 includes, for example, a memory card, a hard disk drive, a USB memory, etc., and stores distance and angle measurement data acquired through measurement, image data obtained by reading the encoder pattern, measurement point coordinates, read angle data, and direction angle data obtained through arithmetic operations. The storage unit 71 may be provided by fixing, or may be removably provided.

The input unit 72 is, for example, operation buttons. An operator can input a command to be executed by the surveying device 60 and select settings with the input unit 72.

The display unit 73 is, for example, a liquid crystal display, and displays various information such as measurement results and arithmetic operation results in response to a command of the arithmetic control unit 74. In addition, the display unit displays setting information for inputting by an operator and commands input by an operator.

It is also possible that the input unit 72 and the display unit 73 are configured integrally as a touch panel type display.

The arithmetic control unit 74 is a microcontroller including a CPU, a GPU (Graphical Processing Unit), etc., mounted on an integrated circuit. The arithmetic control unit 74 is electrically connected to the EDM 61, the horizontal angle detector 62, the vertical angle detector 63, the camera 65, the tracking unit 66, the horizontal rotation drive unit 68, the vertical rotation drive unit 69, the storage unit 71, the input unit 72, and the display unit 73.

Into the arithmetic control unit 74, angle detection signals from the vertical angle detector 63 and the horizontal angle detector 62 are input, and a light receiving signal from the EDM 61 is input. In addition, a signal from the input unit 72 corresponding to an operator's operation is input. Pixel value data output from the imaging device of the camera 65 is also input.

The arithmetic control unit 74 drives the EDM 61, the horizontal rotation drive unit 68, and the vertical rotation drive unit 69, and controls the display unit 38 that displays an operation status and measurement results, etc.

The arithmetic control unit 74 includes, as functional units, a measured coordinate operation unit 75, an encoder pattern read angle operation unit 76, a direction angle operation unit 77, and a coordinate operation unit 78.

The measured coordinate operation unit 75 operates central coordinates of the reflection target based on distance and angle measurement data obtained in the survey unit 64, and outputs operation results to the storage unit 71.

The encoder pattern read angle operation unit 76 reads the encoder pattern 13B from an image of a periphery of the encoder pattern 13 acquired with the camera 65, and calculates an encoder pattern read angle $\theta_E$. Details of the reading of the encoder pattern 13B are described later.

The direction angle operation unit 77 calculates direction angles of the scanner device 30 and the surveying device 60 each mounted on the leveling base 90 based on the encoder pattern read angle $\theta_E$ obtained in the encoder pattern read angle operation unit 76, an offset angle $\theta_T$ of the target unit 10, an offset angle $\theta_S$ of the scanner device 30, and an offset angle $\theta_{TS}$ of the surveying device 60.

The coordinate operation unit 78 operates coordinates of the scanner device 30 and the surveying device 60 based on the measured coordinates of the target and the direction angles of the scanner device 30 and the surveying device 60.

The communication unit 79 enables communication between the surveying device 60 and the display device D, and outputs direction angle data and coordinate data to the display device D. The communication may be wired communication, or may be wireless communication.

1.5 Configuration of Leveling Base

The leveling base 90 is a pedestal on which one of the target unit 10, the scanner device 30, and the surveying device 60 is selectively mounted, and has an automatic leveling function. The leveling base 90 is formed mainly of, as illustrated in FIG. 6, a tripod mounting seat portion 91 to be mounted on a tripod, a leveler main body 92, and three leveling screws 93 joining the tripod mounting seat portion 91 and the leveler main body 92.

The leveler main body 92 includes a tilt sensor, a leveling screw drive mechanism, and a control unit, etc., which are not illustrated, and adjusts the leveling screws 93 by automatically controlling the drive mechanism based on tilt posture information of the tilt sensor so that the leveler main body 92 becomes horizontal. In addition, the leveler main body 92 is provided with a level 97 to check a horizontal state.

In an upper surface of the leveler main body 92, a base mounting hole 94 for mounting the target unit 10, the scanner device 30, or the surveying device 60 is opened. In the base mounting hole 94, three engagement holes 96a, 96b, and 96c are provided at intervals of 120° in the circumferential direction. At an outer rim portion of the leveler main body 92, one fitting groove 98 is formed.

The target unit 10 is positioned in the circumferential direction by the engagement holes 96a, 96b, and 96c and the fitting groove 98, and mounted on the leveling base 90 so as to share the central axis A in the vertical direction. The target unit 10 is removably locked to the leveling base 90 by pressing one engagement projection 15a by a plate spring locking mechanism not illustrated. The scanner device 30 and the surveying device 60 are also mounted on the leveling base 90 in the same manner.

Figure 7A:
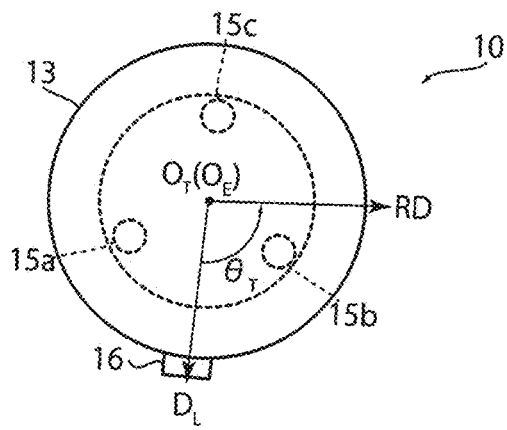
FIG. 7A, FIG. 7B, FIG. 7C, and FIG. 7D are plan views of the target unit, the leveling base, the scanner device, and the surveying device according to the same embodiment, describing a relationship in a horizontal angle direction.
Figure 7B:
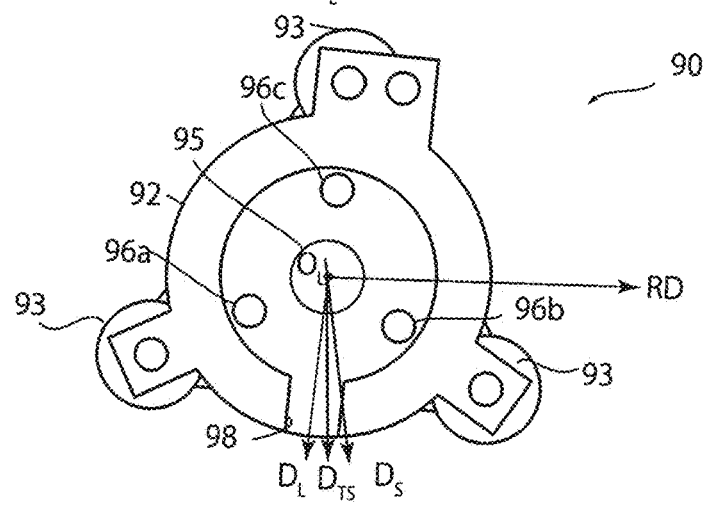
Figure 7C:
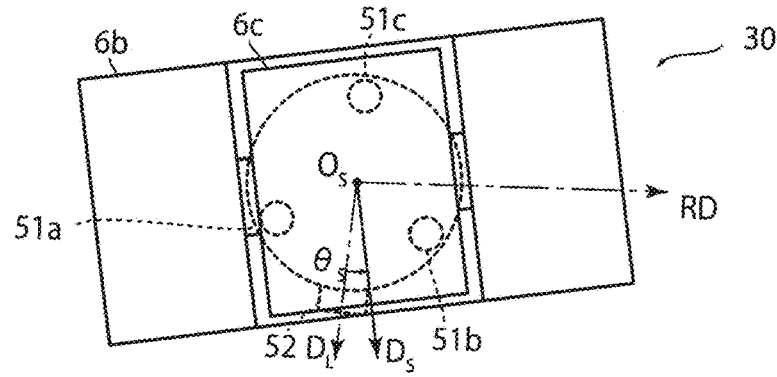
Figure 7D:
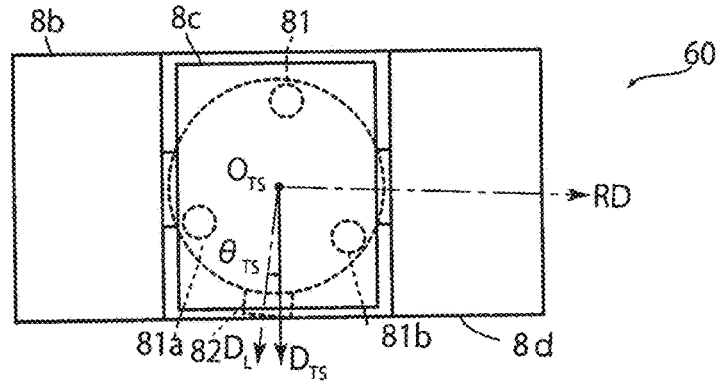
Figure 8:
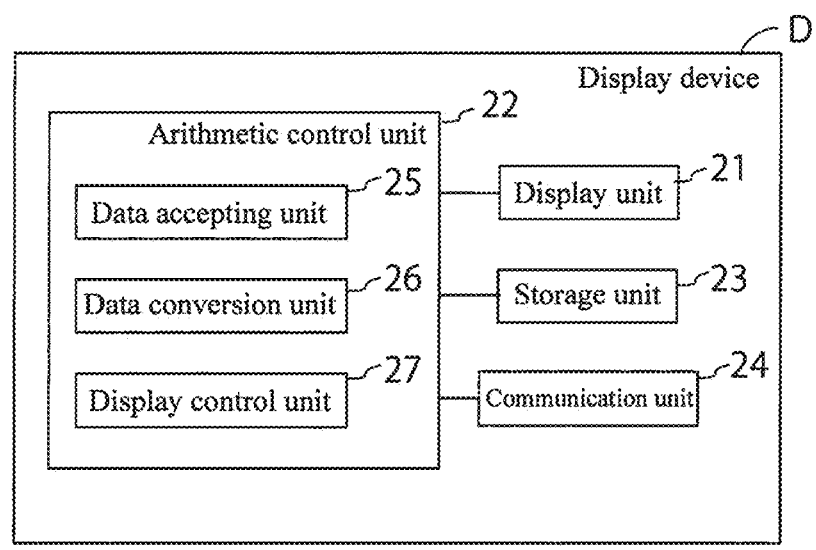
FIG. 8 is a configuration block diagram of a display device according to the same embodiment.

As a result, when the target unit 10 is mounted on the leveling base 90 in the state illustrated in FIG. 7B, their positional relationships are fixed while, as illustrated in FIG. 7A, FIG. 7C, and FIG. 7D, the reference direction RD of the target unit 10, a reference direction $D_S$ of the scanner device 30, and a reference direction $D_{TS}$ of the surveying device 60 respectively deviate by an angle $\theta_T$ (hereinafter, referred to as an "offset angle $\theta_T$ of the target unit 10), an angle $\theta_S$ (hereinafter, referred to as an "offset angle $\theta_S$ of the scanner device 30"), and an angle $\theta_{TS}$ (hereinafter, referred to as an "offset angle $\theta_{TS}$ of the surveying device 60) in the circumferential direction. The reference signs $O_T$, $O_L$, $O_S$, and $O_{TS}$ in the figure respectively denote centers of the target unit 10, the leveling base 90, the scanner device 30, and the surveying device 60.

Here, clockwise angles relative to the north of the reference direction RD of the target unit 10, the direction $D_S$ of the scanner device 30, the direction $D_{TS}$ of the surveying device 60, and the direction $D_L$ of the leveling base 90 are respectively a direction angle of the target unit 10, a direction angle of the scanner device 30, a direction angle of the surveying device 60, and a direction angle of the leveling base 90.

The offset angle $\theta_T$ of the target unit 10, the offset angle $\theta_S$ of the scanner device 30, and the offset angle $\theta_{TS}$ of the surveying device 60 are known in advance by measurement or setting, and stored in the storage unit 71. When an encoder pattern read angle $\theta_E$ is read in a state where the surveying device 60 is installed at a known point and a direction angle is set to a known value α, the encoder pattern read angle $\theta_E$ can be expressed by a function of α. Therefore, a direction angle of the leveling base 90 can be obtained based on the encoder pattern read angle $\theta_E$ and the offset angle $\theta_T$ of the target unit 10. Further, when the direction angle of the leveling base 10 is obtained, based on the offset angle $\theta_S$ of the scanner device 30, a direction angle of the scanner device 30 mounted on the leveling base 90 can be obtained.

The above-described settings of the reference direction $D_L$ of the leveling base 90, the reference direction $D_S$ of the scanner device 30, and the reference direction $D_{TS}$ of the surveying device 60 are just examples in the present embodiment, and can be arbitrarily set.

As described above, by performing positioning in the circumferential direction by using the fitting groove 98 and the engagement holes 96a, 96b, and 96c of the leveling base 90, and setting a horizontal angle around the central axis A to a predetermined angle, positional relationships between the target unit 10, the leveling base 90, the scanner device 30, and the surveying device 60 in a horizontal angle direction around the vertical central axis can be made fixed.

In a mounted state, the positional relationships in the vertical direction between central coordinates of the reflection target 11 of the target unit 10, coordinates of the leveling base 90, coordinates of the scanner device 30, and coordinates of the surveying device 60 is fixed, and their distances are known. Therefore, by obtaining central coordinates of the reflection target 11, coordinates of the leveling base 90, the scanner device 30, and the surveying device 60 are obtained.

1-6. Configuration of Display Device

Figure 9:
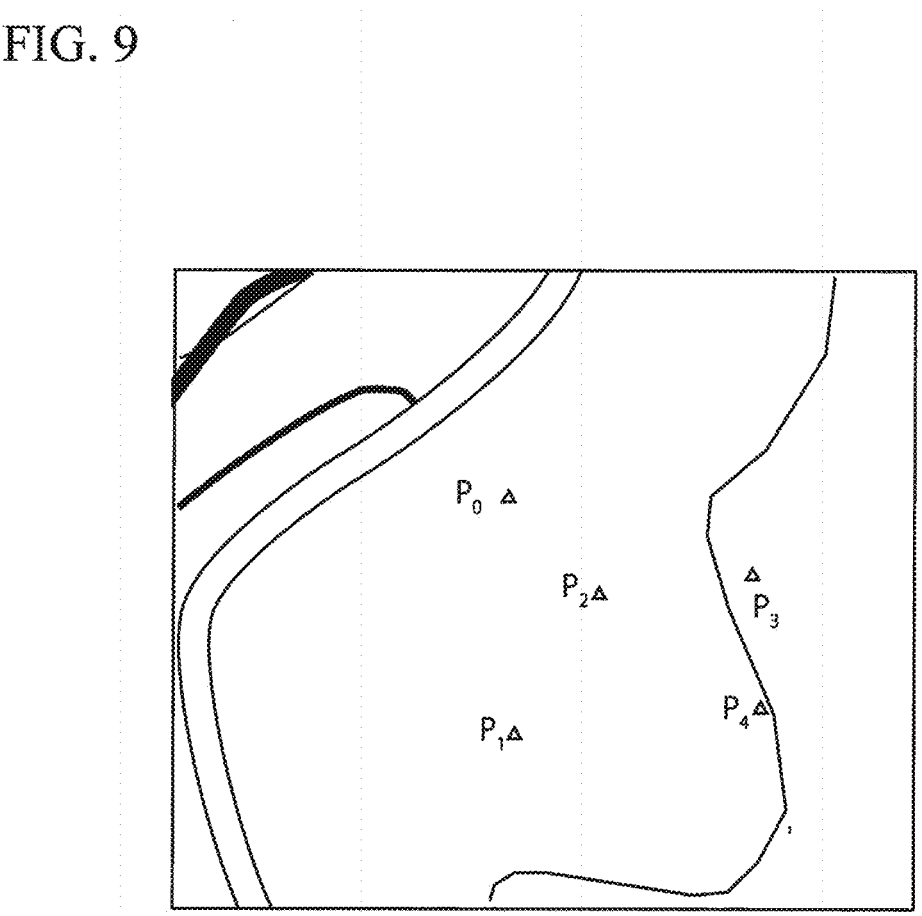
FIG. 9 is a view illustrating an observation plan for observation performed using the point cloud data display system according to the same embodiment.
Figure 10:
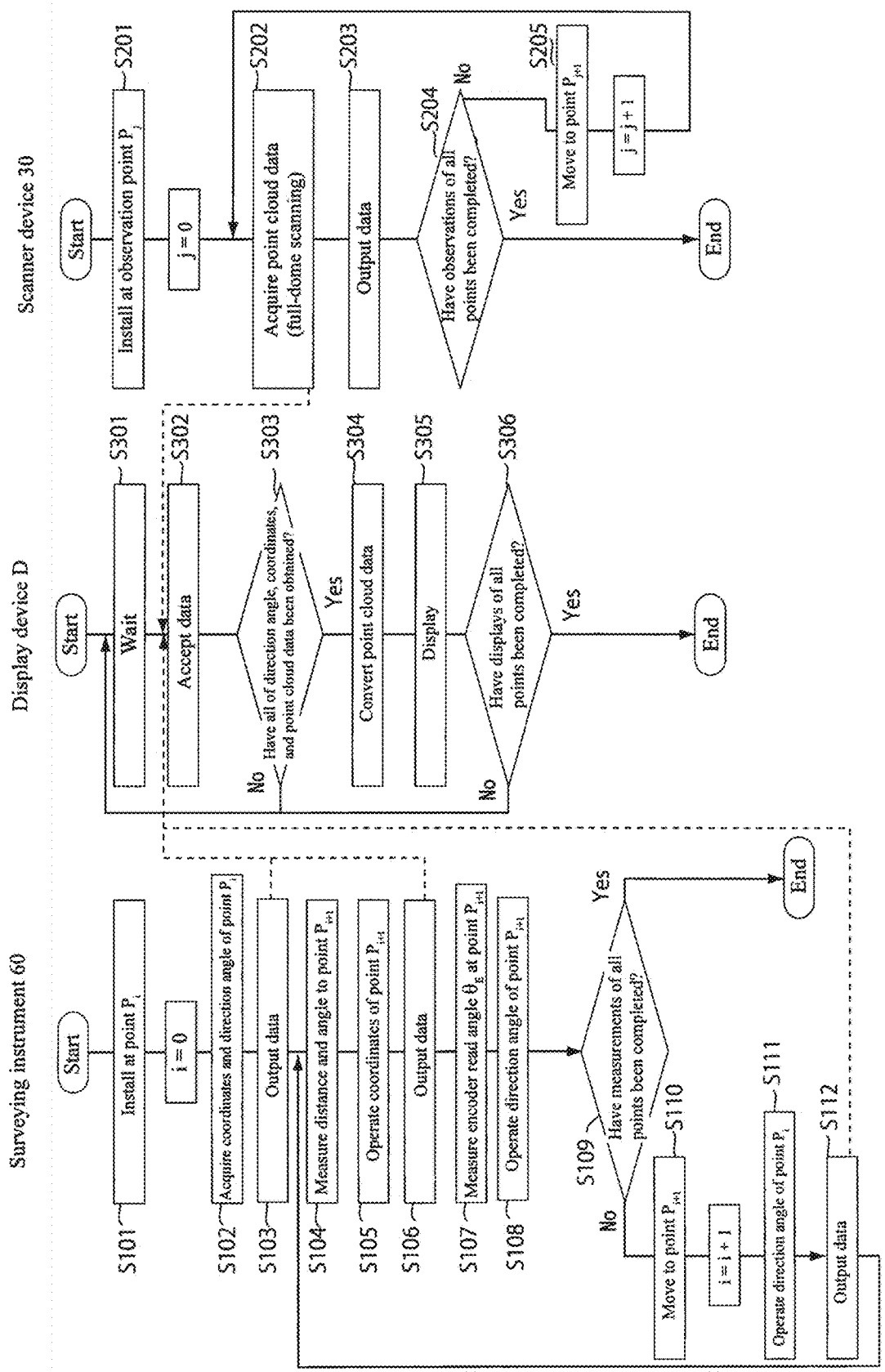
FIG. 10 is a flowchart of point cloud data display processing using the same system.

As illustrated in FIG. 9, the display device D is, for example, a tablet terminal, a smartphone, a personal computer, etc. The display device D includes a display unit 21, an arithmetic control unit 22, a storage unit 23, and a communication unit 24.

The display unit 21 is, for example, a liquid crystal display, and displays input point cloud data according to control of the arithmetic control unit 22.

The arithmetic control unit 22 includes a control storage unit to store programs and a control execution unit to execute the programs, and executes various functions of the display device. As the control storage unit, for example, a ROM can be applied, and as the control execution unit, for example, a CPU can be applied. The arithmetic control unit 22 includes, as functional units, a data accepting unit 25, a data conversion unit 26, and a display control unit 27.

The data accepting unit 25 executes a data accepting program to accept point cloud data associated with an observation point, input from the scanner device 30 through the communication unit 24, and map coordinates and a scanner direction angle associated with the observation point, input from the surveying device 60, determines whether point cloud data, map coordinates, and a scanner direction angle have been all obtained with respect to the observation point, and when these are obtained, outputs these to the data conversion unit 26.

The data conversion unit 26 executes a data conversion program to convert the point cloud data into data in a map coordinate system based on the map coordinates and the scanner direction angle.

The display control unit 27 displays the converted point cloud data on the display unit 21 in association with map data of a measurement region stored in advance in the storage unit 23.

The storage unit 23 is, for example, a RAM, a flash memory, a ROM, a hard disk drive, or the like, and stores the point cloud data, the direction angles, and the coordinate data accepted in the data accepting unit 25 in association with an instrument point.

1-7. Point Cloud Data Display Method

A method of observing and displaying point cloud data by using the point cloud data display system according to the present embodiment is described in terms of a case of observation of a region illustrated in FIG. 9. In the figure, points $P_0$ to $P_4$ are observation points planned in advance.

An observation plan is stored in each of the surveying device 60, the scanner device 30, and the display device D. In the display device D, a map of the observation region is stored in association with map coordinates.

At each of the observation points, a leveling base 90 is installed. The point $P_0$ is a point whose position coordinates and direction angle can be acquired by a backward intersection method or a backsight-point-and-instrument-point method. It is assumed that the target unit 10 is mounted on the leveling base 90 installed at a point to be measured by the surveying device 60. It is also assumed that the surveying device 60 surveys $P_0$ to $P_4$ in this order, and the scanner device 30 performs measurements in an arbitrary order.

With the surveying device 60, when starting observation, in Step S101, an operator installs the surveying device 60 at the point P$_i$ (i=0), and inputs that effect from the input unit.

Next, in Step S102, the surveying device 60 measures a reflection target installed at a known point or a backsight point, and calculates coordinates and a direction angle at the point P$_0$ in a map coordinate system.

Next, in Step S103, the calculated coordinate and direction angle data are output to the display device D in association with the observation point P$_0$.

Next, in Step S104, the survey unit 64 measures a distance and an angle to the point P$_1$, and the measured coordinate operation unit 75 calculates measured coordinates of the reflection target 11.

Next, in Step S105, based on the direction angle of the surveying device 60 at the point P$_0$ and the measured coordinates of the reflection target 11 calculated in S104, coordinates of the point P$_0$ in the map coordinate system are calculated, and the data is output to the display device D in Step S106.

Next, in Step S107, the camera (encoder pattern reading unit) 65 reads the encoder pattern 13B of the target unit 10 at the point P$_1$, and the encoder pattern read angle operation unit 76 calculates an encoder pattern read angle $\theta_E$. The reading of the encoder pattern 13 is described later.

Next, in Step S108, the direction angle operation unit 77 operates a direction angle of the leveling base 90 based on the encoder pattern read angle $\theta_E$ and the offset angle $\theta_T$ of the target unit 10.

Next, in Step S109, the arithmetic control unit 74 determines whether measurements of all planned points have been completed, and when measurements of all points are completed (Yes), the processing is ended.

When the measurements are not completed (No), the surveying device 60 gives a display on the display unit 73 to prompt movement to the next point, and the operator moves the surveying device 60 to the next point P$_1$. In Step S110, when completion of the movement of the surveying device is input from the input unit 72, i=i+1 is set, and in Step S111, the direction angle operation unit 77 operates a direction angle of the surveying device 60 based on the direction angle of the leveling base 90 obtained in Step S108 and the offset angle $\theta_{TS}$ of the surveying device 60, and stores the direction angle in the storage unit 71. Further, the direction angle operation unit operates a direction angle of the scanner device 30 based on the offset angle $\theta_S$ of the scanner device.

Next, in Step S112, the surveying device 60 outputs the direction angle of the scanner device 30 to the display device D. Then, the processing returns to Step S104, and Steps S104 to S112 are repeated until measurements of all points are completed.

On the other hand, with the scanner device 30, when starting a measurement, in Step S201, the operator mounts the scanner device 30 on the leveling base 90 installed at the observation point P. The scanner device 30 and the surveying device 60 can perform measurements independently of each other unless they interfere with each other, that is, i and j do not have to be the same. Measurements by the scanner device 30 do not have to be performed in the same order as those by the surveying device.

Next, in Step S202, the scanner device 30 acquires point cloud data by performing point group data acquisition (full-dome scanning) at the observation point P$_j$, and stores the acquired point cloud data in the external storage device 43.

Next, in Step S203, the scanner device 30 outputs the acquired point cloud data to the display device D in association with the observation point.

Next, in Step S204, whether point cloud observations of all points have been completed is determined, and when observations of all points are completed, the processing ends.

When a measurement is started, in Step S301, the display device D waits for an input of data.

Next, in Step S302, the data accepting unit 25 accepts data from the surveying device 60 and the scanner device 30.

Next, in Step S303, the data accepting unit 25 determines whether all of three data including a scanner direction angle, coordinates in the map coordinate system, and point cloud data have been obtained with respect to one observation point (for example, P$_0$).

When all of the three data have not been obtained (No), the processing returns to Step S301, and the display device D waits again.

When all of the data are obtained (Yes), in Step S304, the data conversion unit 26 converts the point cloud data acquired at the observation point into data in the map coordinate system based on the three data by a publicly known method.

Figure 11:
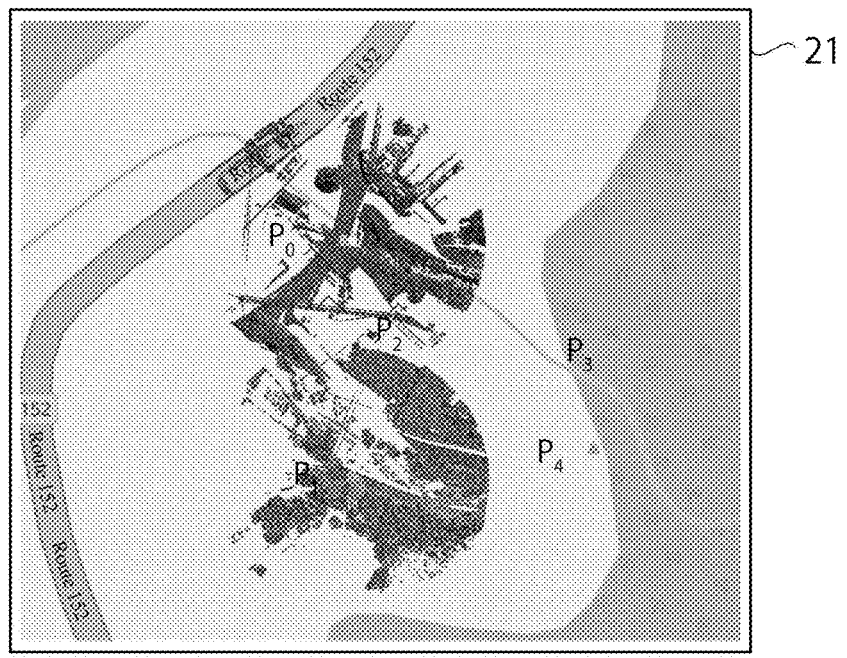
FIG. 11 illustrates an example of display of point cloud data by using the same system.

Next, in Step S305, the display control unit 27 displays the point cloud data converted into the data in the map coordinate system on the display unit 21 in association with a map as illustrated in, for example, FIG. 11.

FIG. 11 illustrates an example of acquired point cloud data projected on a map and displayed. In the figure, a white triangle denotes a planned observation point.

Next, in Step S306, whether displays of all points have been completed is determined, and when displays are completed (Yes), the processing ends. When displays are not completed (No), the processing returns to Step S301, and the display device waits again, and Steps S301 to S306 are repeated until displays of all observation points are completed.

According to the present embodiment, point cloud data with respect to an observation point for which a scanner direction angle, coordinates in the map coordinate system, point cloud data have been obtained, are successively converted into data in the map coordinate system, and displayed on the display device D, so that progress of point cloud data acquisition can be checked on the map in real time. Therefore, a point cloud data acquisition status can be easily grasped. In addition, for example, even when data deficiency occurs, a proper response can be made on-site without re-measurements.

The map on which data are projected is not limited to an illustration map, and may be displayed as an aerial photo associated with map coordinates.

Figure 12:
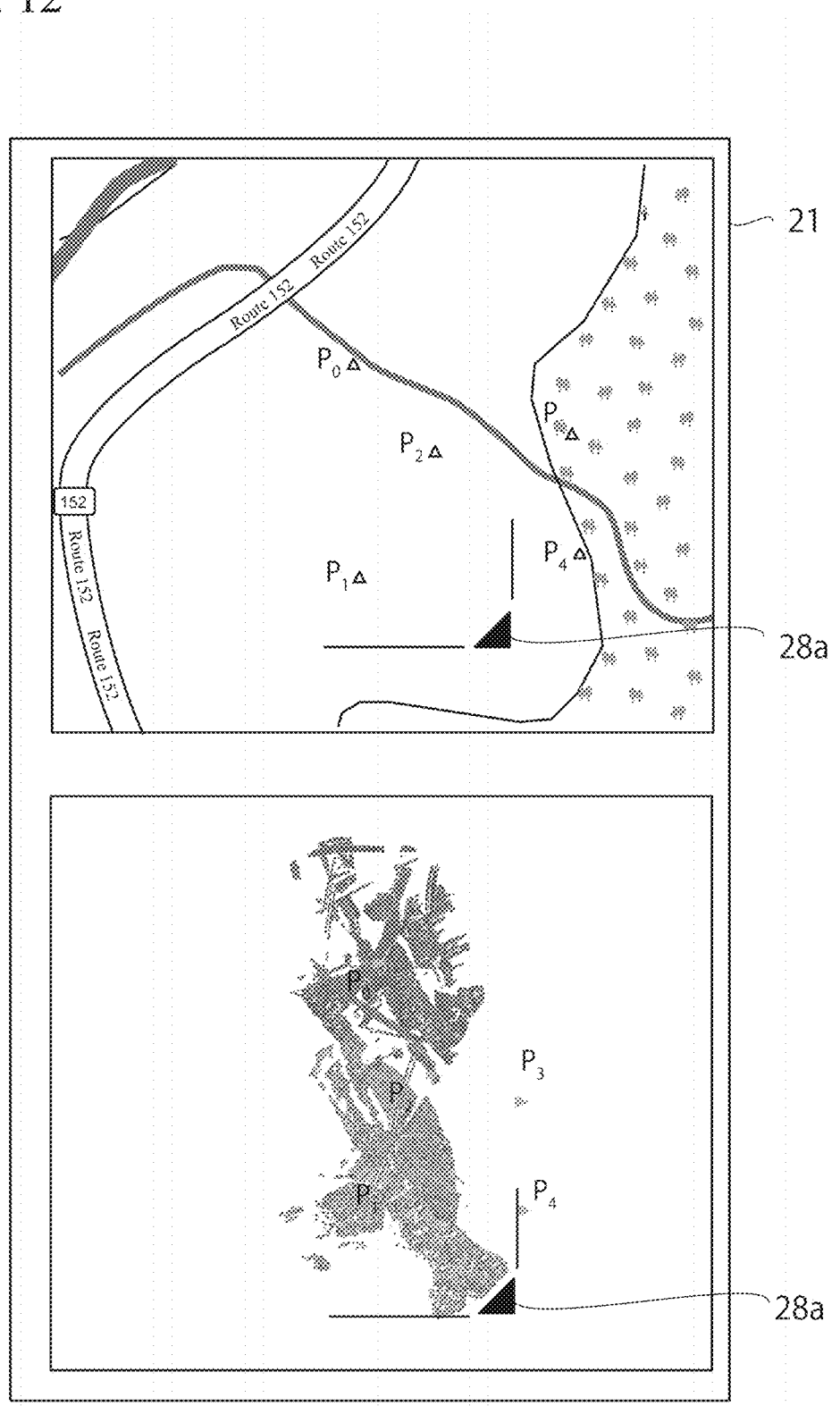
FIG. 12 illustrates another example of display of point cloud data by using the same system.

As in FIG. 12, it is also possible that acquired point cloud data (lower drawing) is three-dimensionally displayed as 3D data and displayed side by side with the map so that a point cloud data acquisition status can be three-dimensionally grasped. Alternatively, a configuration is also possible in which a scope 28a that moves in an interlocking manner on upper and lower screens in response to dragging with a mouse or a swipe with a finger, is displayed, and by specifying a position and a direction with the scope 28a, three-dimensional point cloud data (not illustrated) as viewed from the scope 28a can be displayed.

According to the above-described configuration, displayed data are three-dimensional, so that a point cloud data acquisition status can be more easily grasped. In addition, by using the scope 28a, point cloud data can be checked from the same point of view as that of the operator, so that an observation status can be more easily grasped.

Figure 13A:
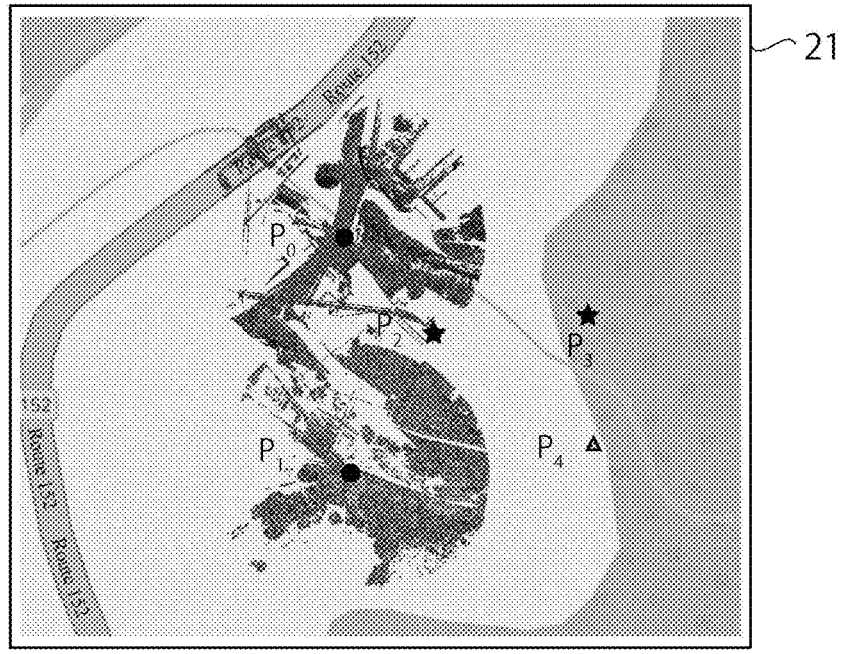
FIG. 13A and FIG. 13B illustrate still other examples of display of point cloud data by using the same system.

It is also possible that, as in FIG. 13A, measured observation points are displayed as well as point cloud data, and each observation point is changed in color or shape according to its state so as to be displayed as a white triangle when coordinates of that observation point are not acquired yet, displayed as a black star when point cloud data are not acquired yet although coordinates and a direction angle of that point have already been acquired, displayed as a black circle in a case where point cloud data have been acquired. In the illustrated example, acquisition of point cloud data has been completed to $P_0$ and $P_1$, acquisition of coordinates has been completed to $P_2$ and $P_3$, and coordinates of $P_4$ need to be measured later.

With the above-described configuration, observation progress can be easily grasped.

Figure 13B:
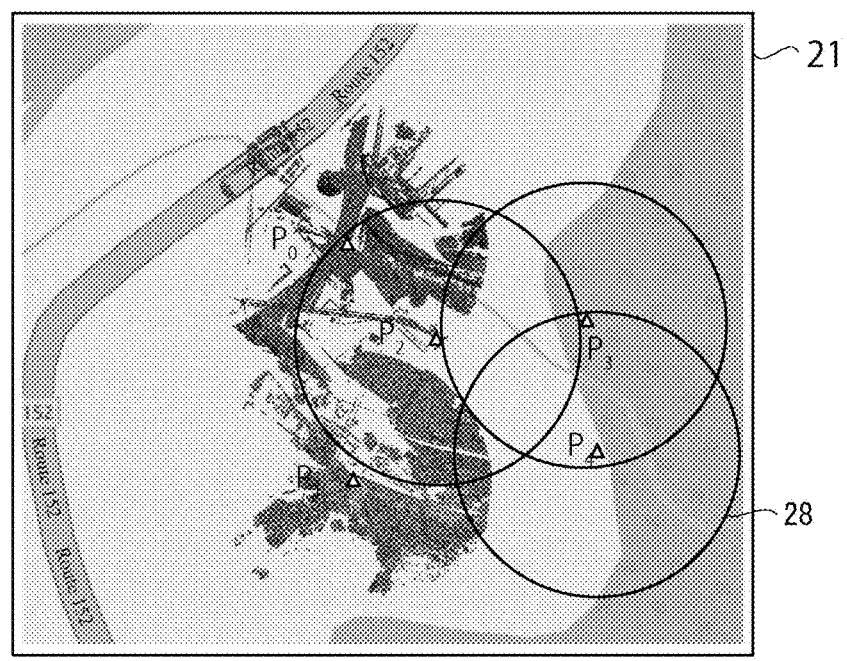
Figure 14:
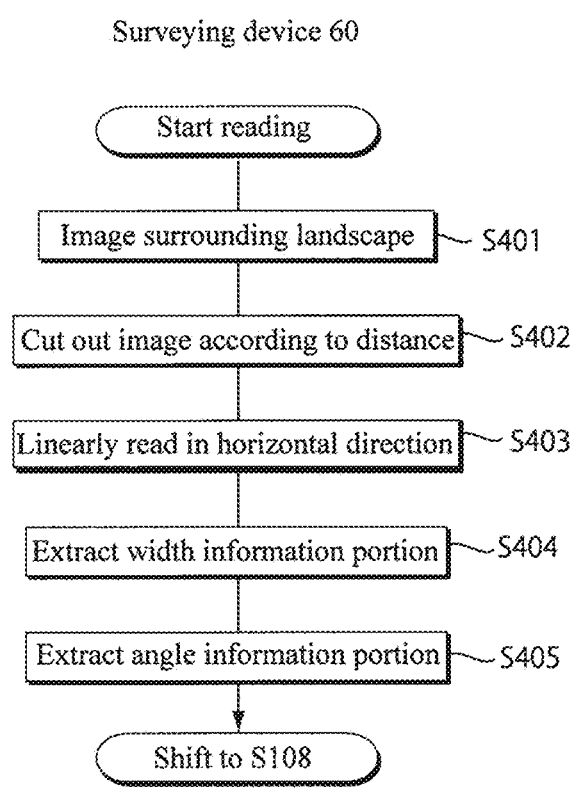
FIG. 14 is a flowchart describing details of reading of the encoder pattern in observation of point cloud data by using the same system.

As in FIG. 13B, a range of point cloud data expected to be acquired from unobserved observation points may be displayed by being superimposed on point cloud data displayed on a map in an overlapping manner. This enables adjustments of the measurement plan on-site while taking into consideration the range of necessary point cloud data, and prevents any leftover data in data acquisition, etc.

1-8. Encoder Pattern Reading

Last, reading of the encoder pattern 13 in Step S107 is described with reference to FIG. 14 and FIG. 15A to FIG. 15C.

Figure 15A:
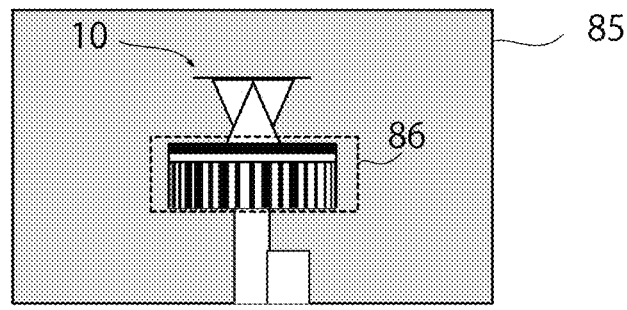
FIG. 15A is a landscape image of a periphery of the encoder pattern portion acquired with a camera of the surveying device according to the same embodiment.

In the surveying device 60, when starting encoder pattern reading in Step S107, in Step S401, the camera (encoder pattern reading unit) 65 acquires a landscape image 85 including the encoder pattern portion 13 (FIG. 15A).

Figure 15B:
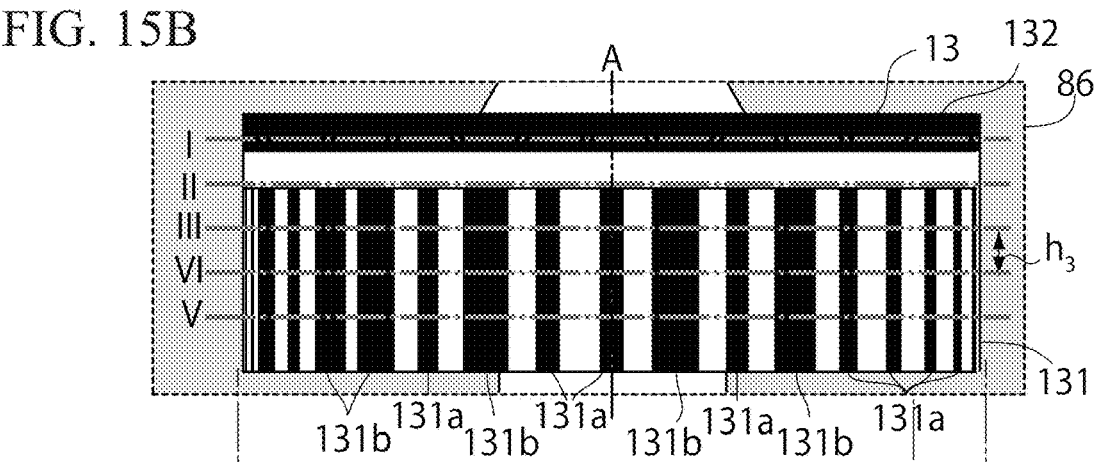
FIG. 15B is an enlarged image of the encoder pattern portion cut out from FIG. 15A.

Next, in Step S402, the encoder pattern read angle operation unit 76 identifies a range 86 of the encoder pattern 13B in the image based on distance measurement data of the reflection target 11 acquired in Step S104 and known dimensions of the encoder pattern portion 13 stored in the storage unit 71, and cuts out the range into a rectangular shape (FIG. 15A and FIG. 15B).

Next, in Step S403, the image of the cut-out range 86 of the encoder pattern 13B is linearly read at intervals $h_3$ in the black zone 132a and the white zone 132b of the width information portion 132, and the angle information portion, and converted into pixel values. Linear reading is performed at positions I to V. Results of the reading at each of positions I to V (hereinafter, referred to as "pixel rows I to V") are, for example, as illustrated in FIG. 15C.

Next, in Step S404, a portion in which a portion corresponding to a black or white portion in the reading results continues for a length corresponding to a diameter L of the encoder pattern portion 13 calculated from the distance measurement data of the reflection target 11 acquired in Step S102 and known dimensions of the encoder pattern portion 13 is defined as a width information portion 132, and from the width L of the encoder pattern 13B detected, a center position of the encoder pattern 13B, matching the central axis A of the support member 12, is identified.

Figure 15C:
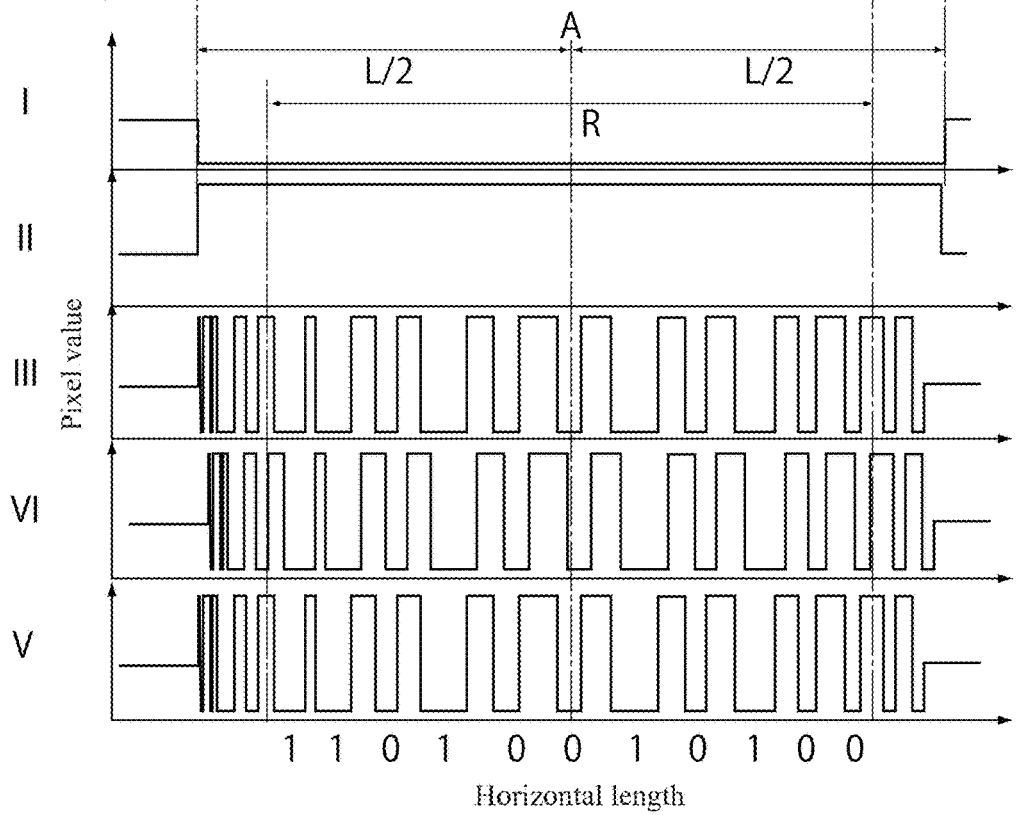
FIG. 15C is a graph illustrating results of linearly reading of FIG. 15B in a circumferential direction and conversion into pixel values.

Next, in Step S405, from the results of reading in Step S403, correlations among pixel rows are calculated, and portions having correlations higher than a predetermined value, that is, in the example in FIG. 15A to FIG. 15C, the portions of the pixel rows III to V, are extracted as the results of reading of the angle information portion 131.

Then, the pixel values of the extracted pixel rows III to V are added up in the vertical direction and mean values are calculated. A portion with a calculated mean value smaller than a predetermined threshold is determined as a black region, and a width of the black region is obtained. Next, whether the obtained width value corresponds to a narrow width or a wide width is determined, and a region with the width determined as a narrow width is read as a bit "0," that is, a vertical line 131a, and a region with the width determined as a wide width is read as a bit "1," that is, a vertical line 131b.

Next, in Step S405, the encoder pattern read angle operation unit 76 calculates an encoder pattern read angle $\theta_E$ by comparing a bit pattern included in a predetermined width R extending to the left and right from a center set at the center position A of the encoder pattern 13B obtained in Step S403, that is, a bit pattern represented by a predetermined bit number of vertical lines included in the region of the predetermined width R, with the correlations between bit patterns and angles stored in the storage unit 71.

1-9. Modification

As a modification of the present embodiment, it is also possible that, as depicted by the dashed lines in FIG. 4, the scanner device 30 includes a point cloud data extraction unit so as to extract a portion of point cloud data and thin-out the data to be output before outputting the data in Step S203.

As a method of extracting point cloud data, the following method can be used.

(1) Extract point cloud data only when an elevation angle or horizontal angle of the scanner is at a predetermined value.
(2) Specify predetermined coordinates in a coordinate system centered at the scanner and extract point cloud data of the coordinates.
(3) When a plurality of data are present in directions radially extending from the scanner in a coordinate system centered at the scanner, extract data at a distance shortest or longest from the scanner.
(4) Install a reflection sheet at intended positions, and select and extract data with reflection intensity higher than a predetermined value.

In this way, by providing the point cloud data extraction unit 58 in the scanner device so that point cloud data are partially extracted to reduce the size of the point cloud data, the time and cost required for data output (communication) to the display device D can be reduced. The time required for subsequent data conversion processing can also be shortened.

2. Second Embodiment

Figure 16:
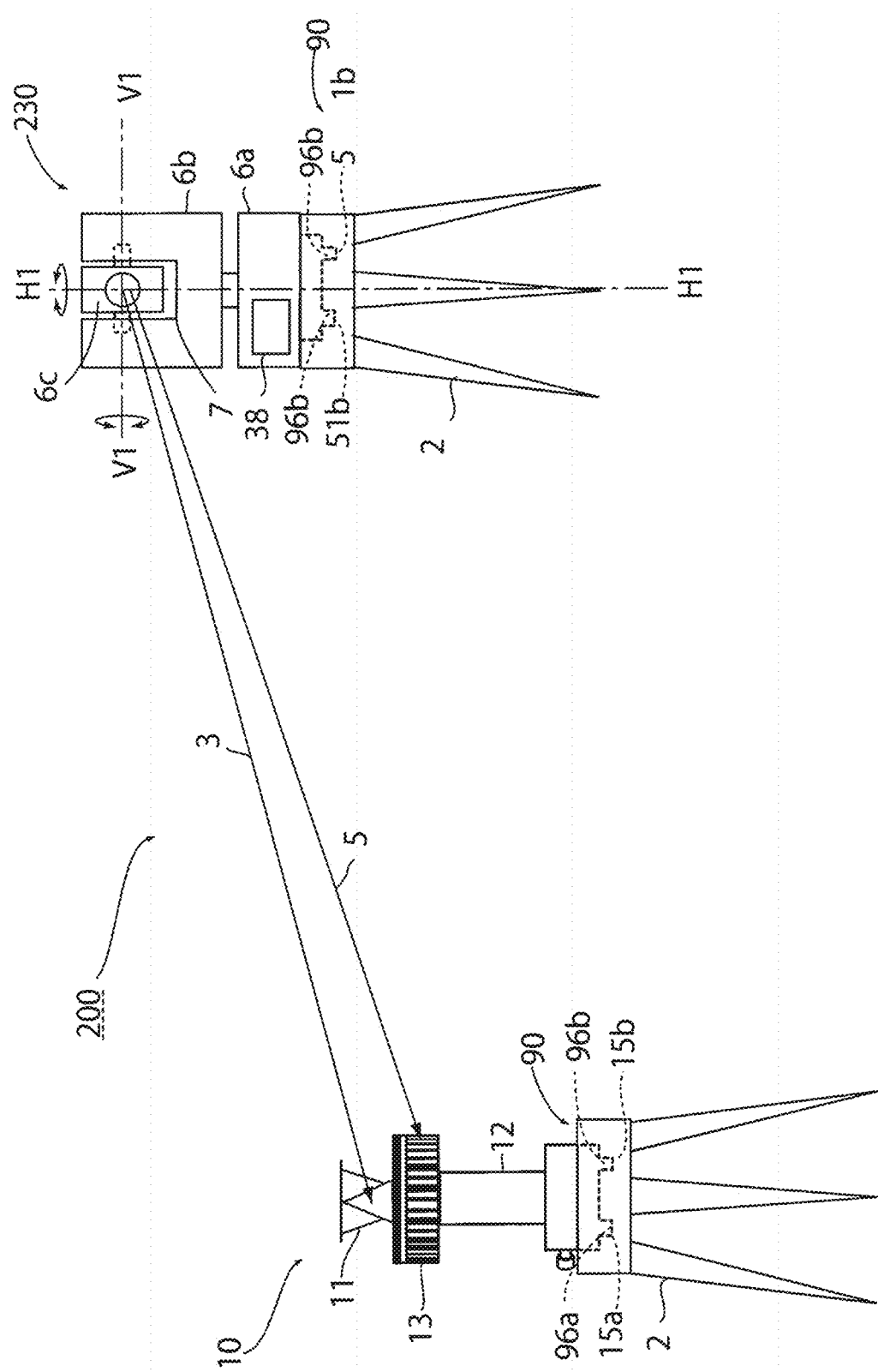
FIG. 16 is a view illustrating an overall configuration of a point cloud data display system according to a second embodiment of the present invention.
Figure 17:
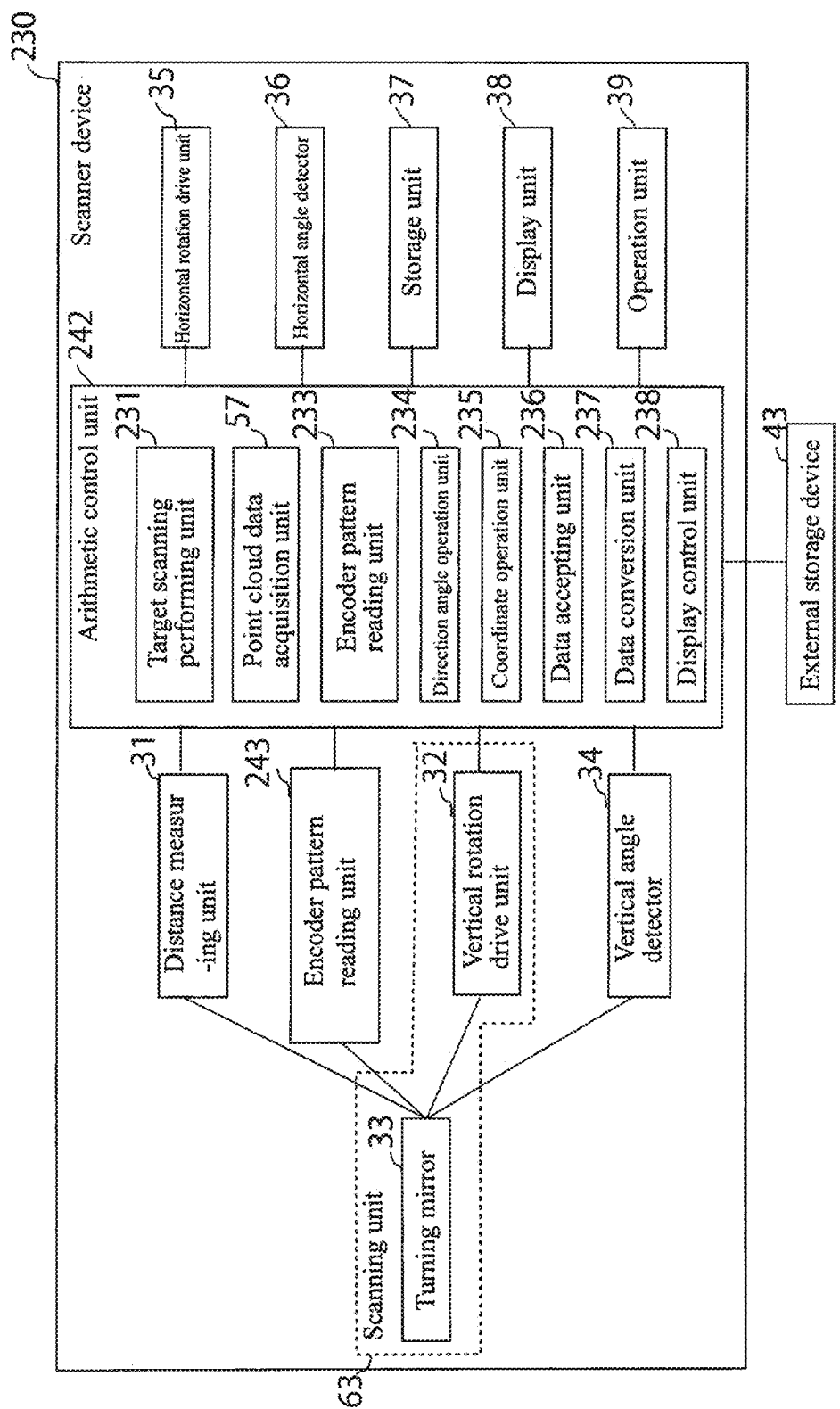
FIG. 17 is a configuration block diagram of a scanner device according to the same embodiment.

As illustrated in FIG. 16, a point cloud data display system 200 according to a second embodiment includes a target unit 10 and a scanner device 230.

The scanner device 230 is a laser scanner having a configuration similar to that of the scanner device 30 according to the first embodiment, and including the distance measuring unit 31, the vertical rotation drive unit 32, the turning mirror 33, the vertical angle detector 34, the horizontal rotation drive unit 35, the horizontal angle detector 36, the storage unit 37, the display unit 38, the operation unit 39, and the external storage device 43. However, the scanner device 230 is different from that of the first embodiment in that it does not include the communication unit 41, but includes an encoder pattern reading unit 243.

In addition, the scanner device 230 is different from that of the first embodiment in that the arithmetic control unit 242 includes, as functional units, in addition to the point cloud data acquisition unit 57, a target scanning performing unit 231 that performs target scanning to measure a distance and an angle by intensively irradiating distance measuring light onto a peripheral range around the reflection target, and calculates measured coordinates of the reflection target from the distance and angle measurement data, an encoder pattern read angle operation unit 233 that operates an encoder pattern read angle $\theta_E$ from a result of encoder pattern reading, a direction angle operation unit 234 that operates direction angles of the leveling base 90 and the scanner device 30 based on the offset angle $\theta_T$ of the target unit 10, the offset angle $\theta_S$ of the scanner device 30, and the encoder pattern read angle $\theta_E$, and a coordinate operation unit 235 that operates coordinates of an installation point of the device in a map coordinate system based on the measured coordinates of the reflection target 11 and the direction angle of the scanner device 30.

Further, the scanner device 230 is also different from that of the first embodiment in that the arithmetic control unit 242 further includes, as functional units, a data accepting unit 236, a data conversion unit 237, and a display control unit 238.

Figure 18:
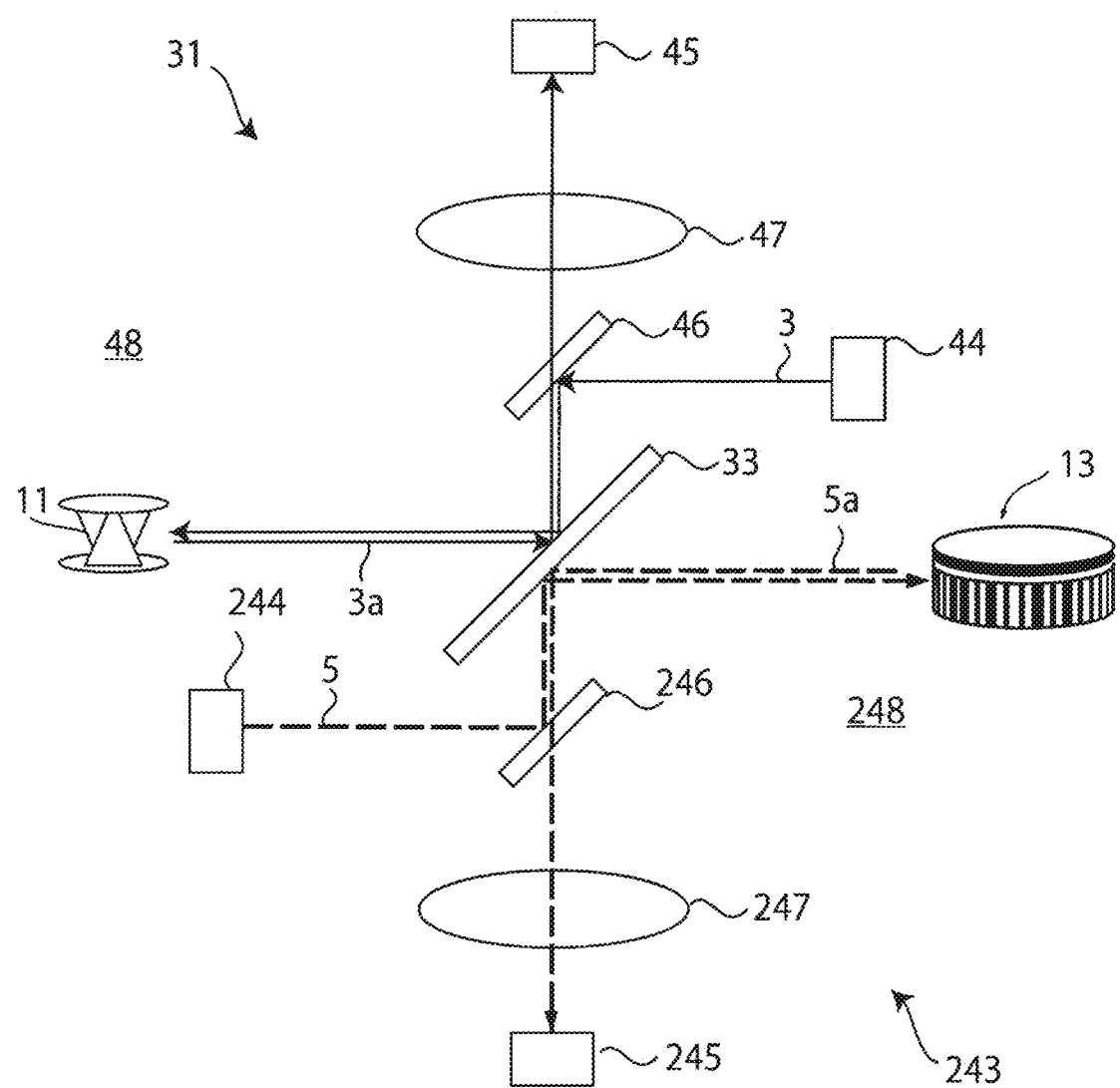
FIG. 18 is a schematic view describing a mechanism for light transmission and reception in a distance measuring unit and an encoder pattern reading unit of the same scanner device.

The encoder pattern reading unit 243 includes, as illustrated in FIG. 18, a reading light transmission and receiving optical system 248 including a reading light transmission unit 244, a reading light receiving unit 245, a reading light mirror 246, and a reading light condenser lens 247. The reading light transmission unit 244 includes a light emitting element (not illustrated), and emits a light beam with a wavelength different from that of the distance measuring light 3, for example, visible light, etc., as encoder pattern reading light 5. The emitted encoder pattern reading light 5 is reflected by the reading light mirror 53. The encoder pattern reading light is further reflected by the turning mirror 33 and irradiated onto the encoder pattern 13B.

In FIG. 18, the reference signs 44, 45, 46, 47 and 48 respectively denote a distance measuring light transmission unit, a distance measuring light receiving unit, a distance measuring light mirror, a distance measuring light condenser lens, and a distance measuring light transmission and receiving optical system of the distance measuring unit 31, and the refraction of the encoder pattern reading light 5 is performed by a surface of the turning mirror 33 on the reverse side of a surface that reflects the distance measuring light 3.

Then, the reading light 5a reflected by the encoder pattern 13B enters the reading light receiving unit 245 through the turning mirror 33, the reading light mirror 246, and the reading light condenser lens 247. The reading light receiving unit 24 is a light receiving element, for example, an avalanche photodiode, etc. Light receiving signals input into the reading light receiving unit 245 are output as a received light amount distribution to the arithmetic control unit 42. Based on the received light amount distribution, in the same manner as in the first embodiment, the encoder pattern read angle operation unit 233 converts a bit pattern into a read angle from the encoder pattern reading results.

The data accepting unit 236 accepts point cloud data associated with an observation point and map coordinates and a scanner direction angle associated with an observation point, determines whether point cloud data, map coordinates, and a scanner direction angle have been all obtained with respect to the observation point, and when all of these data are obtained, outputs these to the data conversion unit 237.

The data conversion unit 237 converts the point cloud data into data in the map coordinate system based on the map coordinates and the scanner direction angle.

The display control unit 238 displays the converted point cloud data on the display unit 39 in association with map data of a measurement region stored in advance in the storage unit 23.

In this way, the scanner device 230 of the second embodiment has functions of the surveying device 60 and the display device D of the first embodiment.

Figure 19:
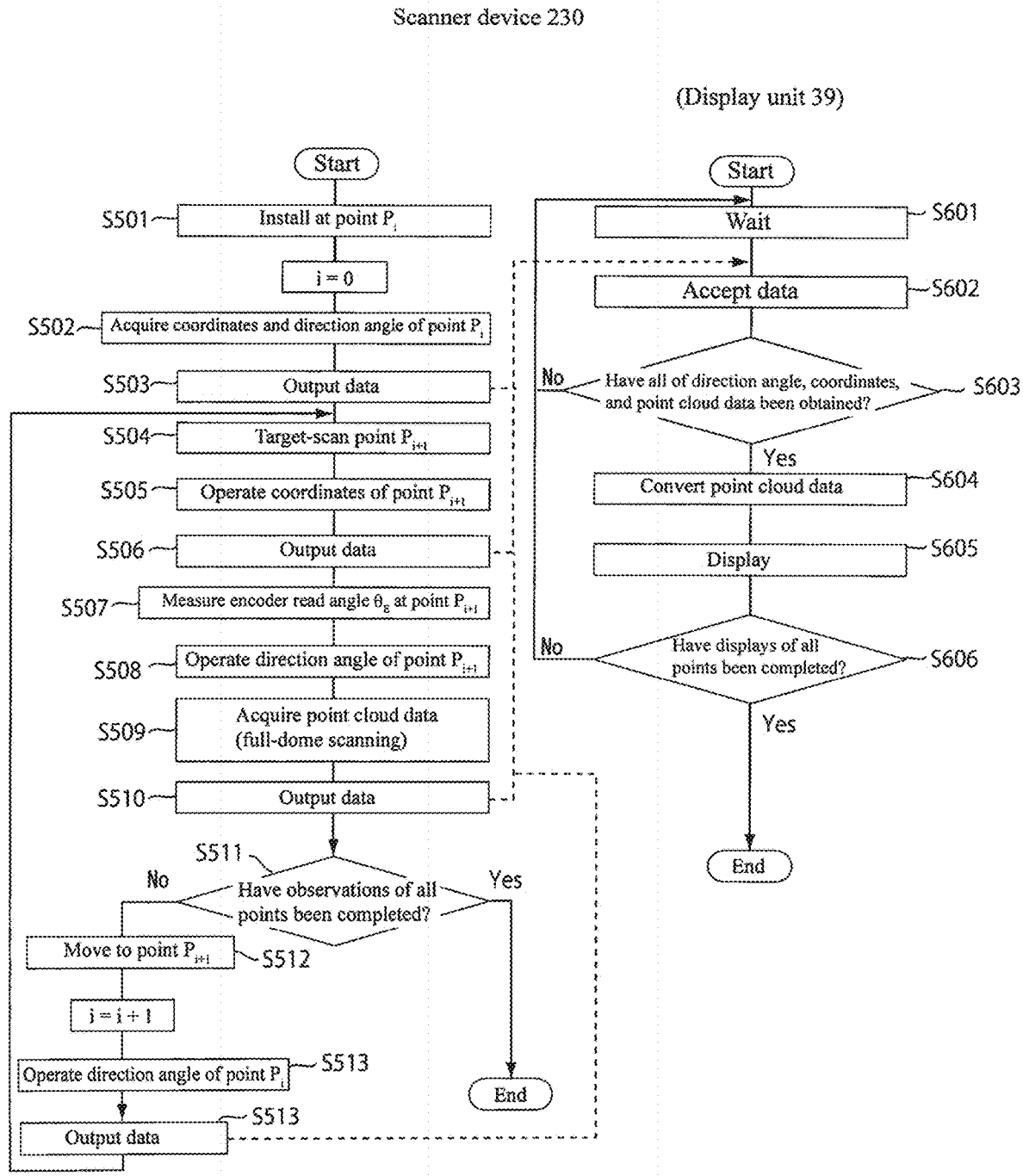
FIG. 19 is a flowchart of point cloud data display processing using the same system.

Therefore, operation of the scanner device 230 when acquiring point cloud data according to the second embodiment is as illustrated in FIG. 19. The left flowchart in the figure is a flowchart relating to a survey function (point cloud data acquisition, encoder pattern reading) of the scanner device 230, and the right flowchart is a flowchart relating to a display function. Detailed descriptions of operations in the respective steps are omitted because the operations are the same as those in the first embodiment except that a distance measurement and an angle measurement with the surveying device are performed by target scanning in the scanning device, and data output is performed not by communication between devices but by data exchange within the same device.

In the embodiments described above, a system is configured in which a target unit includes an encoder pattern portion, and a scanner device or a surveying device equipped with an encoder pattern reading unit, and capable of calculating a direction angle without measuring a known point or a backsight point, is used, however, without limiting to this, in a point cloud data observation system, a system or a device capable of measuring point cloud data, coordinates of an observation point in a map coordinate system, and a direction angle of the scanner device at the observation point can be applied as an embodiment of the present invention.

Embodiments of the present invention are described above, and the above-described embodiments are just examples, and can be combined based on knowledge of a person skilled in the art. The above-described embodiments can be variously changed without departing from the spirit of the invention. As a matter of course, the scope of rights of the present invention is not limited to the above-described embodiments.

REFERENCE SIGNS LIST

10 Target unit
11 Reflection target
13B Encoder pattern
21 Display unit
22 Arithmetic control unit
25 Data accepting unit
26 Data conversion unit
27 Display control unit
30 Scanner device
31 Distance measuring unit
34 Vertical angle detector
36 Horizontal angle detector
42 Arithmetic control unit
44 Distance measuring light transmission unit
45 Distance measuring light receiving unit
49 Scanning unit
57 Point cloud data acquisition unit
58 Point cloud data extraction unit
59 Direction angle operation unit
60 Surveying device (Surveying instrument)
64 Survey unit
65 Encoder pattern reading unit (camera)
74 Arithmetic control unit
75 Measured coordinate operation unit 76 Encoder pattern read angle operation unit
77 Direction angle operation unit
78 Coordinate operation unit
90 Leveling base
100 Point cloud data display system
200 Point cloud data display system
230 Scanner device
231 Target scanning performing unit
233 Encoder pattern read angle operation unit
234 Direction angle operation unit
235 Coordinate operation unit
236 Data accepting unit
237 Data conversion unit
238 Display control unit
242 Arithmetic control unit
243 Encoder pattern reading unit

What is claimed is:

1. A point cloud data display system comprising:
a target unit including a reflection target and an encoder pattern showing an angle in a circumferential direction around a central axis of the target unit;
a scanner device including a distance measuring unit configured to perform a distance measurement by transmitting distance measuring light and receiving reflected distance measuring light reflected by a measuring object, a scanning unit configured to scan a measurement range by distance measuring light, angle detectors configured to detect an emitting direction of the measuring light, and an arithmetic control unit configured to acquire point cloud data of the measurement range;
a surveying instrument including a survey unit configured to measure a distance and an angle to the reflection target, an encoder pattern reading unit configured to optically read the encoder pattern and an arithmetic control unit configured to calculate coordinates of the reflection target based on distance and angle measurement data of the reflection target and calculate an encoder pattern read angle based on a result of a reading by the encoder pattern reading unit;
a display device including an arithmetic control unit configured to process data output from the scanner device and the surveying instrument, and a display unit; and
a leveling base configured to selectively allow one of the target unit, the scanner device, and the surveying instrument to be removably mounted so as to share a central axis in the vertical direction, and having offset angles, being known, around the central axis with respect to each of the target unit, the scanner device, and the surveying instrument wherein
the scanner device is configured to acquire point cloud data on an observation point at which the scanner device is installed on the leveling base to output the point cloud data to the display device,
the surveying instrument is configured to measure the target unit installed at the observation point on the leveling base to acquire and output coordinates in a map coordinate system and a direction angle of the scanner device when installed at the observation point, with the surveying instrument having known coordinates and a direction angle in the map coordinates system, and
the arithmetic control unit of the display device is configured to include a data accepting unit configured to determine whether the point cloud data and the coordinates and the direction angle of the scanner device at the observation point have been all obtained, a data conversion unit configured to convert the point cloud data into data in the map coordinate system, and a display control unit configured to display converted point cloud data on the display unit in association with a map.

2. The point cloud data display system according to claim 1, wherein
the surveying instrument is the scanner device, and
the arithmetic control unit of the scanner device is configured to include a target scanning performing unit configured to acquire the distance and angle measurement data based on point cloud data obtained by intensively scanning a periphery of the reflection target, and calculate measured coordinates and a direction angle of the scanner device.

3. The point cloud data display system according to claim 1, wherein the scanner device is configured to include the display device.

4. The point cloud data display system according to claim 2, wherein the scanner device is configured to include the display device.

5. The point cloud data display system according to claim 1, wherein the scanner device is configured to include a point cloud data extraction unit configured to partially extract the point cloud data, and output the extracted data to the display device.

6. The point cloud data display system according to claim 2, wherein the scanner device is configured to include a point cloud data extraction unit configured to partially extract the point cloud data, and output the extracted data to the display device.

7. The point cloud data display system according to claim 3, wherein the scanner device is configured to include a point cloud data extraction unit configured to partially extract the point cloud data, and output the extracted data to the display device.

* * * * *